(12) United States Patent
Yamamura

(10) Patent No.: US 8,310,762 B2
(45) Date of Patent: Nov. 13, 2012

(54) LENS ARRAY, LENS UNIT, LED HEAD, EXPOSURE DEVICE, IMAGE FORMING DEVICE, READING DEVICE, METHOD FOR MANUFACTURING LENS ARRAY, AND FORMING DIE

(75) Inventor: Akihiro Yamamura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 13/234,403

(22) Filed: Sep. 16, 2011

(65) Prior Publication Data

US 2012/0069430 A1    Mar. 22, 2012

(30) Foreign Application Priority Data

Sep. 17, 2010 (JP) .................................. 2010-208860

(51) Int. Cl.
*G02B 27/10* (2006.01)
(52) U.S. Cl. ........ 359/622; 359/619; 359/621; 359/624; 359/455; 359/456; 359/463; 362/330; 362/244
(58) Field of Classification Search .......... 359/454–456, 359/463, 465, 618, 619, 621, 622, 626, 628, 359/738; 362/329–331, 511, 606, 608, 615, 362/620; 353/20, 22, 30, 38, 50; 358/474; 349/56
See application file for complete search history.

(56) References Cited

U.S. PATENT DOCUMENTS

| | | | | |
|---|---|---|---|---|
| 6,369,949 B1 * | 4/2002 | Conley | ........................ | 359/619 |
| 6,396,636 B2 * | 5/2002 | Sawaki et al. | ................. | 359/624 |
| 6,545,813 B1 * | 4/2003 | Matthies et al. | .............. | 359/622 |
| 6,646,807 B2 * | 11/2003 | Yoshikawa et al. | ........... | 359/619 |
| 6,693,748 B1 * | 2/2004 | Fujimoto et al. | .............. | 359/621 |
| 6,829,087 B2 * | 12/2004 | Freese et al. | .................. | 359/455 |
| 7,736,019 B2 * | 6/2010 | Shimada et al. | .............. | 362/244 |
| 7,736,029 B2 * | 6/2010 | Chen et al. | ..................... | 362/330 |
| 2011/0134495 A1 * | 6/2011 | Nagata | ......................... | 358/474 |

FOREIGN PATENT DOCUMENTS

JP    A-2009-86649    4/2009

* cited by examiner

*Primary Examiner* — Loha Ben
(74) *Attorney, Agent, or Firm* — Posz Law Group, PLC

(57) ABSTRACT

A lens array includes a plurality of lenses having respective optical axes that are approximately parallel to each other, wherein the plurality of lenses are configured in a direction approximately perpendicular to the optical axes and are formed integrally with each other, and a maximum inclination angle of a lens surface on each of a predetermined number of the plurality of lenses is less than or equal 50.8 degrees or less, the maximum inclination angle being defined as a maximum value of an angle formed by an optical axis and a normal line of a lens surface of one of the predetermined number of the plurality of lenses.

19 Claims, 16 Drawing Sheets

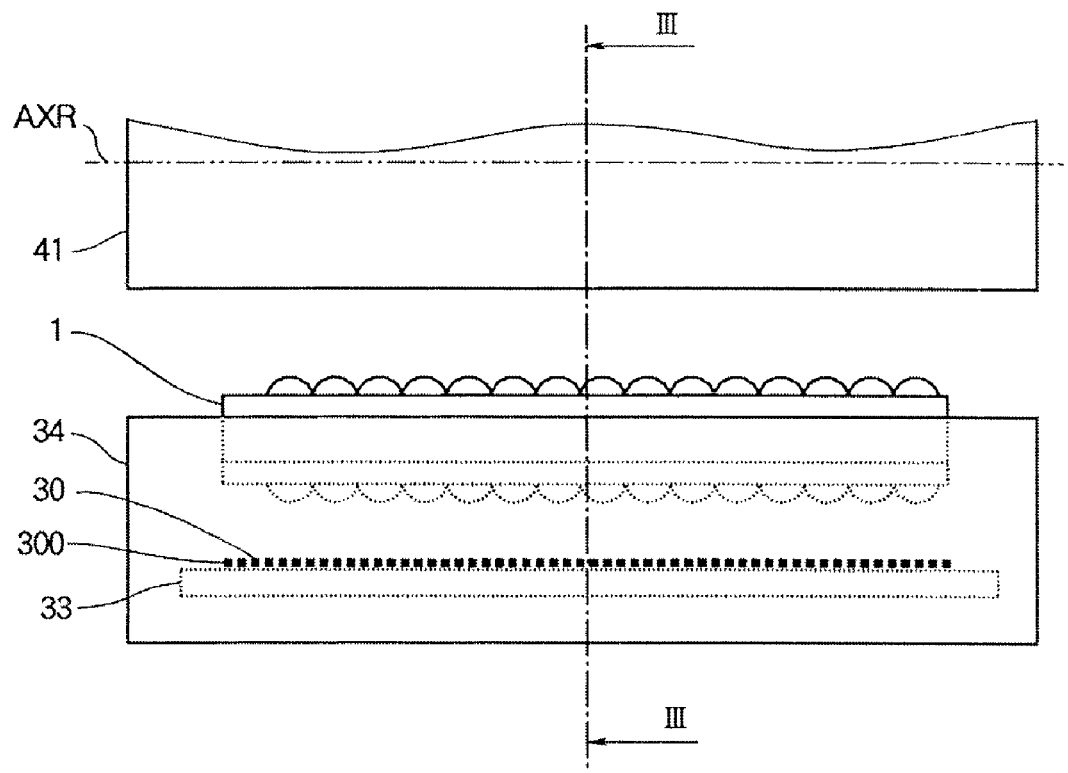
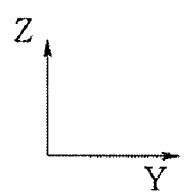
Fig. 2

LENS ARRAY, LENS UNIT, LED HEAD, EXPOSURE DEVICE, IMAGE FORMING DEVICE, READING DEVICE, METHOD FOR MANUFACTURING LENS ARRAY, AND FORMING DIE

CROSS REFERENCE TO RELATED APPLICATION

The present application is related to, claims priority from and incorporates by reference Japanese patent application No. 2010-208860, filed on Sep. 17, 2010.

TECHNICAL FIELD

The present invention relates to a lens array, a lens unit, a light emitting diode (LED) head, an exposure device, an image forming device, a reading device, a method for manufacturing a lens array and a forming die.

BACKGROUND

Conventionally, an electrographic image forming device for forming an image using an LED head where a plurality of light emitting diodes (LEDs) are arrayed in an approximately linear arrangement, and a reading device, such as a scanner, a facsimile and the like, for forming an image of a manuscript on a light receiving part where a plurality of light receiving elements are arrayed in an approximately linear arrangement are known. In these devices, as an optical system for linearly forming an equal magnification erect image of an object, a lens array where a plurality of micro-lenses are arrayed in an approximately linear arrangement is used (for example, JP Laid-Open Patent Application No. 2009-86649 (see FIG. 5)).

Although the lens array such as described above is generally formed by injection molding, it is known that flow marks are generated at the time of injection molding, reducing lens array resolution. Consequently, when a lens array is used in an optical system of an imaging forming device, there is a problem that stripes and/or density unevenness is generated on a printed image. In addition, when the lens array used for an optical system of a reading device, there is a problem that the image data of a manuscript cannot be accurately taken in.

In view of the problems above, the objective of the present application is to prevent the reduction of the lens array resolution caused by flow marks at the time of molding.

SUMMARY

A lens array disclosed in the application includes: a plurality of lenses having respective optical axes that are approximately parallel to each other, wherein the plurality of lenses are configured in a direction approximately perpendicular to the optical axes and are formed integrally with each other, and a maximum inclination angle of a lens surface on each of a predetermined number of the plurality of lenses is less than or equal 50.8 degrees or less, the maximum inclination angle being defined as a maximum value of an angle formed by an optical axis and a normal line of a lens surface of one of the predetermined number of the plurality of lenses.

In another view, a forming die disclosed in the application to be used for forming a lens array including a plurality of lenses having respective optical axes that are approximately parallel to each other, the forming die includes: separable first mold and second mold that form a cavity when clamped together for forming the lens array, wherein curved surfaces that correspond to lens surfaces of the plurality of lenses are formed in the first mold and the second mold, and a maximum inclination angle of one of the curved surfaces is 50.8 degrees or less, the maximum inclination angle being defined as a maximum value of an angle formed by a direction corresponding to an optical axis of each of a predetermined number of the plurality of lenses and a normal line of the one of the curved surfaces.

According to the present application, by adjusting a maximum inclination angle of a lens surface to 50.8 degrees or less, a flow of molten resin inside a mold at the time of injection molding can be smoothed, and generation of flow marks is prevented. As a result, the reduction of the lens array resolution is prevented.

It is preferred that the maximum inclination angles of all of the lenses are formed to be 50.8 degrees or less. However, in view of practical use, it is possible to realize the invention when 70% of the lenses have the maximum inclination angles that are 50.8 degrees or less.

BRIEF DESCRIPTION OF THE DRAWINGS

FIG. 2 is illustrates an LED head as an exposure device in the first embodiment.

DETAILED DESCRIPTION

Figure 1:
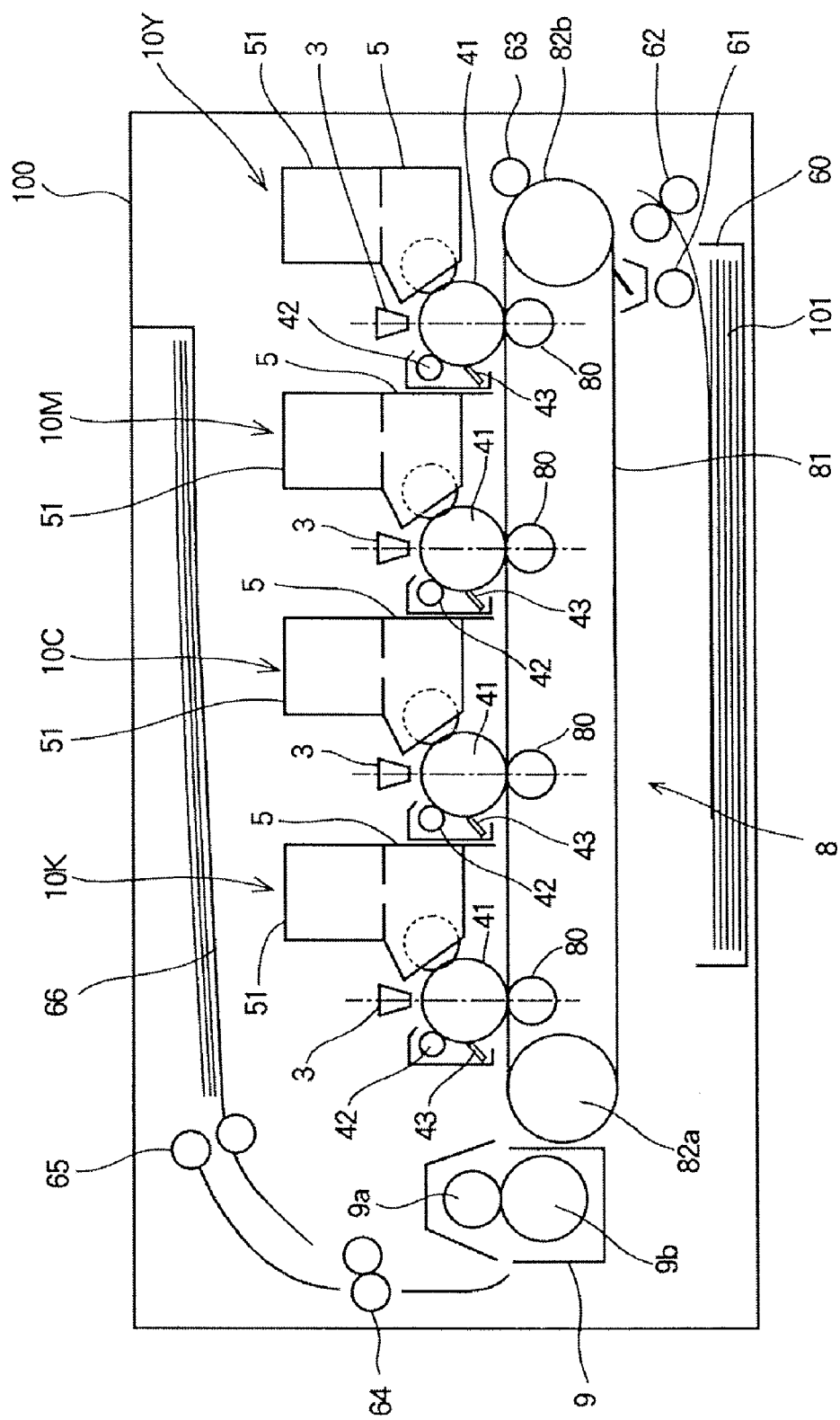
FIG. 1 is illustrates a printer as an image forming device in a first embodiment of the present application.

<Overall configuration of image forming device> FIG. 1 illustrates a printer 100 as an image forming device in a first embodiment of the present application. A printer 100 forms an image on a print medium using resin toners (developing agents) containing pigments as coloring materials using electrophotography based upon entered image data.

The printer 100 is a so-called color LED printer, and is provided with process units (image forming units) 10Y, 10M, 10C and 10K forming images of each color of yellow, magenta, cyan and black, respectively. Since each of the process units 10Y, 10M, 10C and 10K has a common configuration, the process units 10Y, 10M, 10C and 10K are collectively referred to as a process unit 10. The process units 10Y, 10M, 10C and 10K are arranged in line (here, from right to left in FIG. 1) along a carrying path of a sheet 101.

The process unit 10 includes a photosensitive body (e.g., photosensitive drum) 41 as an electrostatic latent image carrier. A charge roller (charge device) 42, an LED head (exposure device) 3, a developer 5 and a cleaning blade 43 are arranged around the photosensitive drum 41. The charge roller 42 supplies an electric charge onto a surface of the photosensitive drum 41 to uniformly charge the surface. The LED head 3 selectively irradiates light onto the surface of the charged the photosensitive drum 41 according to image data and forms an electrostatic latent image. The developer 5 develops the electrostatic latent image formed on the surface of the photosensitive drum 41 with toners and forms a toner image. A toner cartridge 51 for supplying toner is attached to the developer 5. Further, the cleaning blade 43 removes toner remaining on the surface of the photosensitive drum 41 after transferring the toner image (described later).

A sheet supply cassette 60 for accommodating the sheets 101 as the print media is loaded at a lower part of the printer 100. A sheet supply roller 61 that takes a sheet 101 out from the sheet supply cassette 60 and sends the sheet 101 to the carrying path is included in the vicinity of the sheet supply cassette 60. Carrying rollers 62 and 63 that carry the sheet 101 toward the process units 10Y, 10M, 10C and 10K are provided adjacent to the sheet supply roller 61.

A transfer belt unit 8 is arranged below the process units 10Y, 10M, 10C and 10K. The transfer belt unit 8 includes a transfer belt 81 that carries the sheet 101 along the process units 10Y, 10M, 10C and 10K, a drive roller 82a and a driven roller 82b on which the transfer belt 81 is stretched. The transfer belt 81 carries the sheet 101 along the process units 10Y, 10M, 10C and 10K by sticking and holding the sheet 101 on the surface, and by moves due to the rotation of the drive roller 82a.

Four transfer rollers (transfer devices) 80 are arranged so as to sandwich the transfer belt 81 with the photosensitive drums 41 of the process units 10Y, 10M, 10C and 10K. The transfer rollers 80 transfer the toner images formed on the respective photosensitive drums 41 onto the sheet 101.

A fuser 9 is arranged downstream of the process units 10Y, 10M, 10C and 10K along the carrying path of the sheets 101. The fuser 9 includes a heating roller 9a and a pressure roller 9b and fixes the toner images transferred onto the sheet 101 by heat and pressure. Further, ejecting rollers 64 and 65 that eject the sheet 101 passing through the fuser 9 to an ejection part 66 outside printer 100 are arranged further downstream of the fuser 9.

A predetermined voltage from a power source (not shown) is applied on the above-described charge roller 42 and the transfer roller 80. Further, a drive force is transmitted through a gear to the photosensitive drums 41 and respective rollers from motors (not shown).

The printer 100 is includes an external interface that receives print data from an external device and a control part (not shown) that performs the overall control of the printer 100. Further, a control part and a power source are connected to each of the developer 5, LED head 3, fuser 9 and each motor (not shown).

<LED Head> Next, a configuration of the LED head 3 in the present embodiment is described. FIG. 2 is a schematic diagram showing a configuration of the LED head 3 as an exposure device in the present embodiment. The LED head 3 includes an LED array 300 in which a plurality of LED elements 30 (light emitting parts) are arrayed in an approximately linear arrangement in line, a wiring substrate 33 on which the LED array 300 is arranged, a lens unit 1 arranged to face the LED array 300, and a holder 34 which supports the lens unit 1.

Here, a longitudinal direction of the LED array 300, that is, an array direction of the LED element 30, is made to be a Y direction (right-left direction in FIG. 2). The lens unit 1 has an elongated shape and is arranged so as to match the longitudinal direction with the Y direction. FIG. 2 shows the photosensitive drum 41 together, as well, and the rotational axis of the photosensitive drum 41 is indicated with symbol AXR (single dot dashed line). The rotational axis AXR of the photosensitive drum 41 is parallel to the longitudinal direction (Y direction) of the LED array 300 and the lens unit 1. A plurality of microlenses are arrayed on the lens unit 1 in the Y direction, and the direction of an optical axis of each microlens is a Z direction that is perpendicular to the Y direction (up-down direction in FIG. 2).

Figure 3:
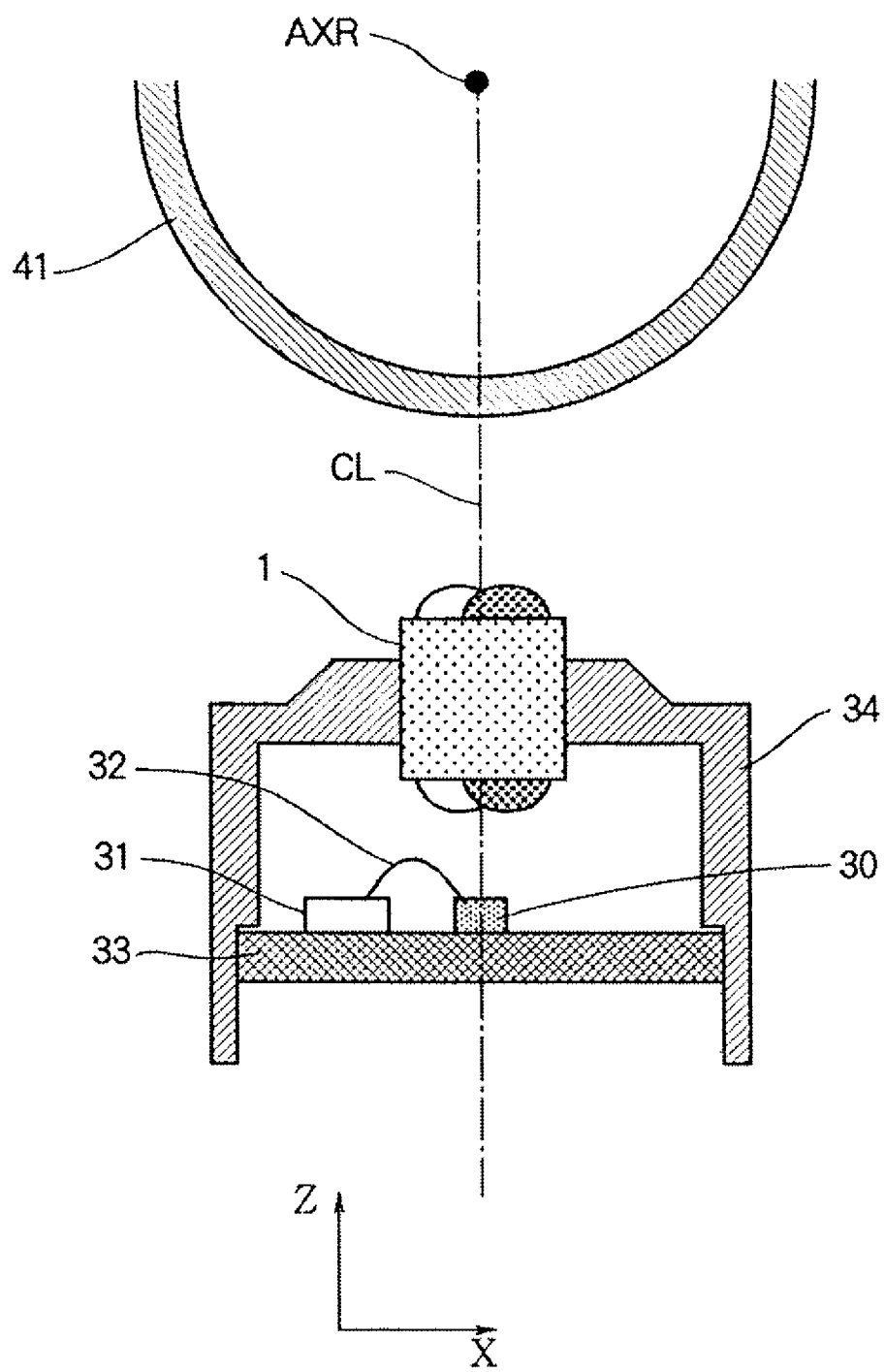
FIG. 3 is a cross-sectional diagram of the LED head in line segment III-III shown in FIG. 2.

FIG. 3 is a cross-sectional diagram of the LED head 3 at line segment III-III shown in FIG. 2. The lens unit 1 has width in an X direction (right-left direction in FIG. 3) that is perpendicular to the Y direction (the longitudinal direction of the lens unit 1) and the Z direction (optical axis direction of the microlens). When a straight line in the Z direction passing through the center of the lens unit 1 in the X direction is a center line CL, the LED elements 30 and the rotational axes AXR of the photosensitive drum 41 are positioned on an extension of the center line CL.

The wiring substrate 33 on which the LED array 300 is arranged is mounted in the holder 34. The driver IC 31 for driving the LED elements 30 is arranged on the wiring substrate 33. The LED element 30 and the driver IC 31 are connected to each other by a wire 32.

Figure 4:
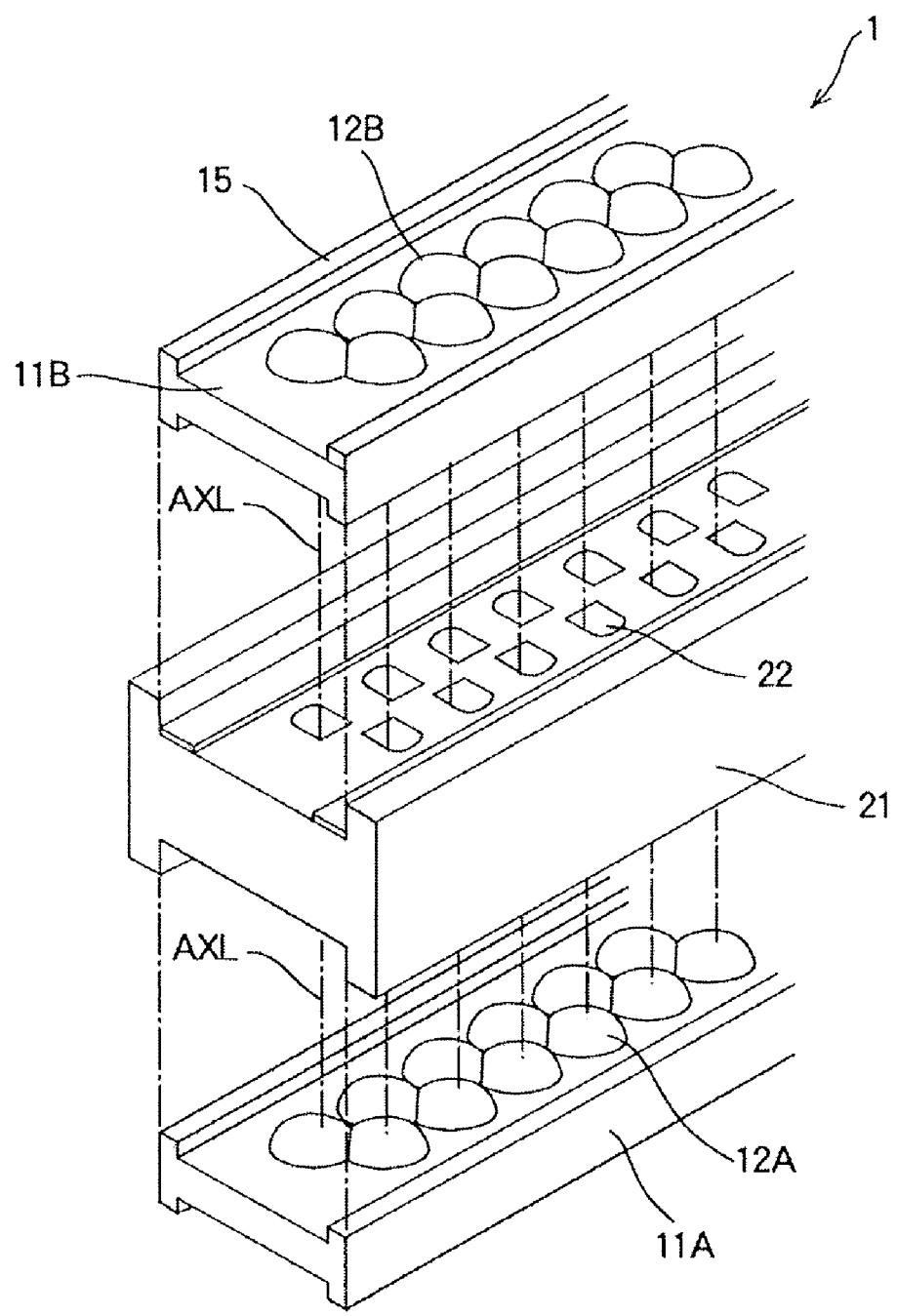
FIG. 4 is an exploded perspective view showing a lens unit in the first embodiment.

<Lens Unit> Next, a configuration of the lens unit 1 in the present embodiment is described. FIG. 4 is an exploded perspective view showing the lens unit 1 in the present embodiment. The lens unit 1 is provided with a first lens plate (a lens array on the object side) 11A, a second lens plate (a lens array on the image forming side) 11B and a light-blocking plate 21 (light-blocking member) arranged between the first lens plate 11A and the second lens plate 11B. First lenses 12A are arrayed as microlenses in two rows on the first lens plate 11A in a staggered arrangement. Second lenses 12B are arrayed as microlenses in two rows on the second lens plate 11B in a staggered arrangement.

Both the first lenses 12A and the second lenses 12B are arrayed in two rows in the longitudinal direction (Y direction) of the lens unit 1. Further, the direction of the optical axes AXL of the first lenses 12A and the second lenses 12B is the Z direction as mentioned above. Openings 22 are arrayed as aperture diaphragms in the light-blocking plate 21 in two rows in the Y direction. The first lenses 12A and the second lenses 12B are arranged at the same array intervals so that the optical axes AXL respectively coincide.

In other words, the lens unit 1 is configured so that lens groups composed of two microlenses and a diaphragm arranged so that the optical axes mutually coincide are arranged in two rows in a direction perpendicular to the optical axes.

Figure 5:
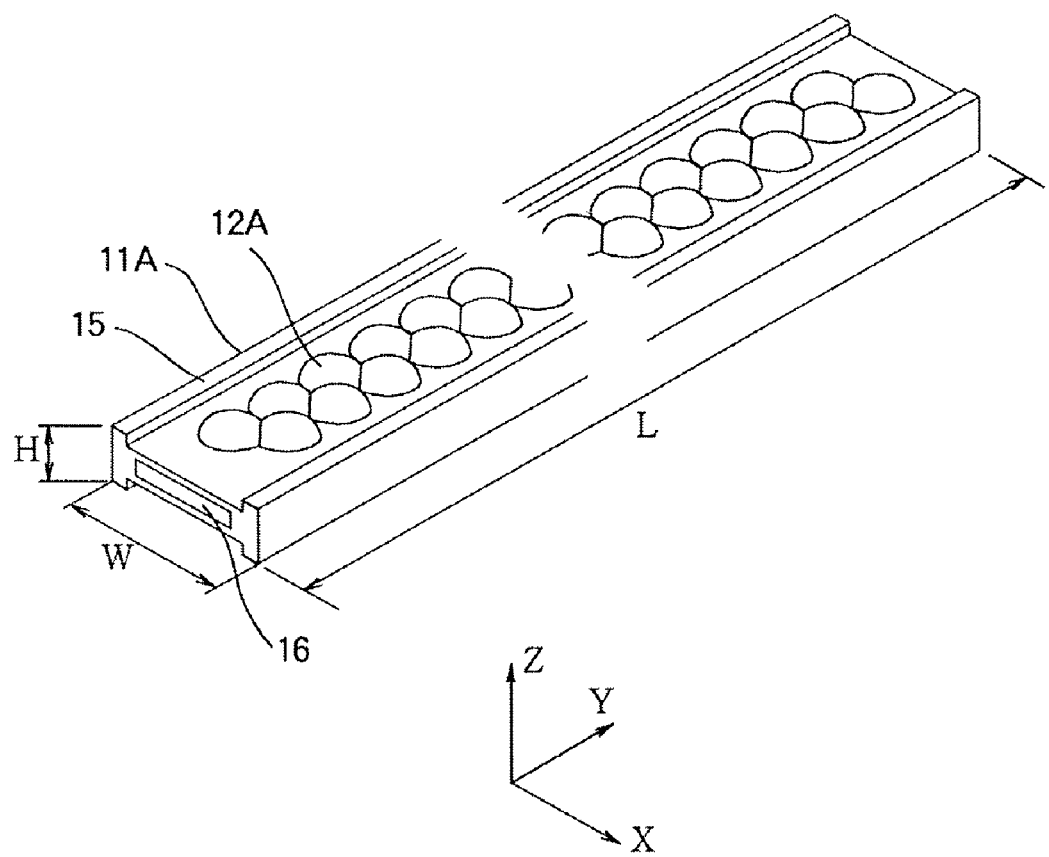
FIG. 5 is a perspective view showing a first lens plate in the first embodiment.

FIG. 5 is a perspective view showing a configuration of the first lens plate 11A. The first lenses 12A are arrayed in an approximately linear arrangement in the longitudinal direction (Y direction) of the lens plate 11A by making the optical axis direction to be the Z direction, as described above. Ribs 15 protruding in the Z direction are formed at both ends of the lens plate 11A in the width direction (X direction), and each extend in the Y direction. Further, a gate mark 16 is formed at one end of the lens plate 11A in the longitudinal direction (Y direction). The gate mark 16 is where the shape of a gate 717 as described later is transferred at the time of injection molding. Dimensions of the lens plate 11A in the longitudinal direction (Y direction), the width direction (X direction) and the thickness direction (Z direction) are defined as L, W and H, respectively.

Figure 6:
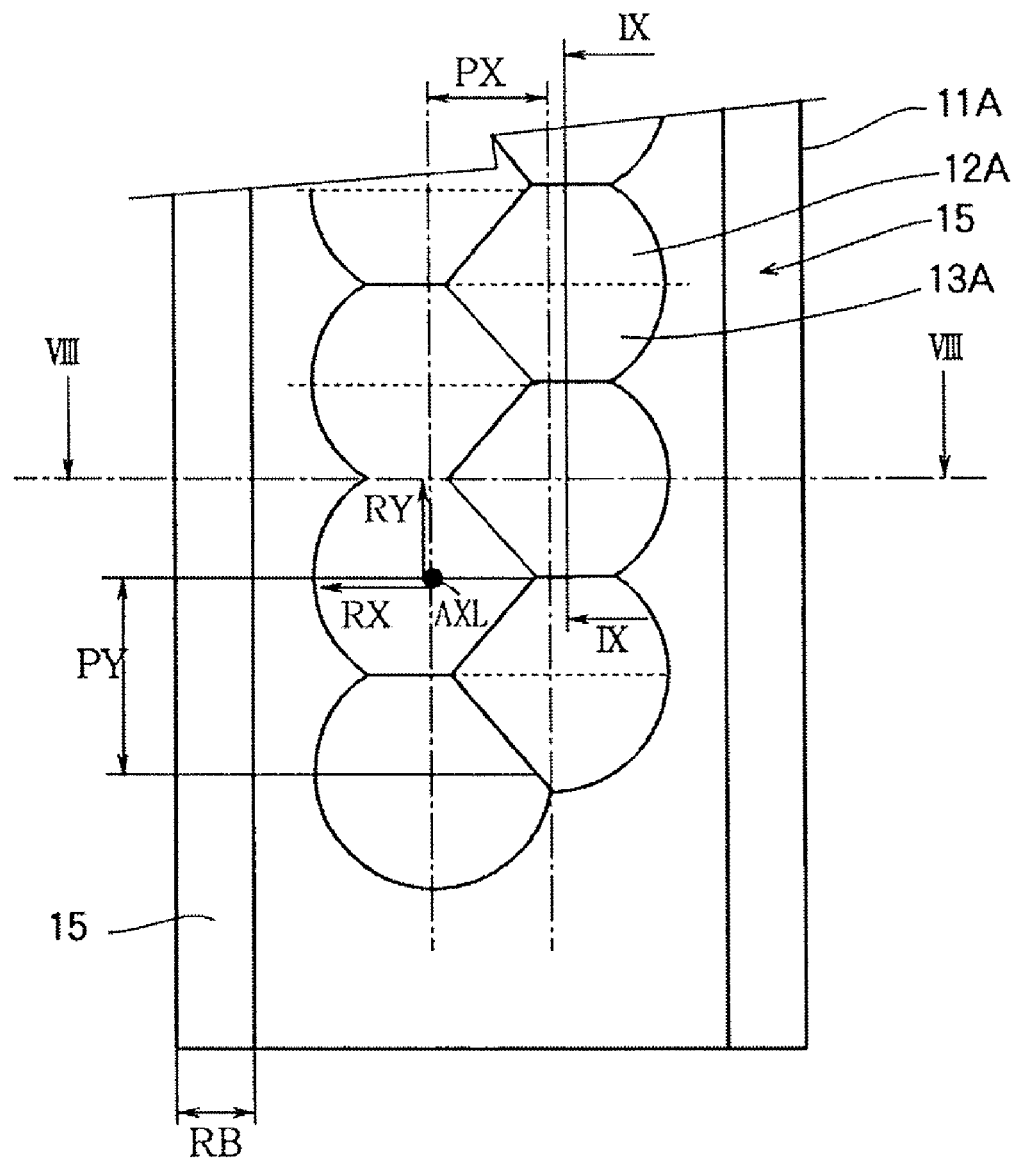
FIG. 6 is a plane view showing the first lens plate in the first embodiment.

FIG. 6 is a plane view showing a configuration of the first lens plate 11A. A plurality of the first lenses 12A are arranged on the first lens plate 11A in two rows in the Y direction as described above. A lens surface of the first lens 12A on the object side is an outer lens surface 13A as a first lens surface, and the lens surface on the image formation side (hidden in FIG. 6) is an inner lens surface 14A as a second lens surface (see FIG. 8). The optical axis AXL of the first lens 12A coincides with the optical axis of the outer lens surface 13A and the optical axis of the inner lens surface 14A.

Array intervals of the first lenses 12A are PY in the longitudinal direction (Y direction) and PX in the width direction (X direction) of the first lens plate 11A. Further, a radius of the outer lens surface 13A and the inner lens surface 14A of the first lens 12A is RY in the Y direction and RX in the X direction. The outer lens surface 13A makes contact with the outer lens surface 13A adjacent to the proximate row at a linear boundary line (a boundary line extending in the X direction) and also with the outer lens surface 13A adjacent to the next row at a linear boundary line (a boundary line inclined at approximately 45 degrees relative to the X direction), and are continuously arranged without spacing. Therefore, the radius RY of the outer lens surface 13A in the Y direction is the same as PY/2 (one-half of the array interval) and is smaller than the radius RX in the X direction. Further, a dimension of the rib 15 of the first lens plate 11A in the X direction is RB.

The second lens plate 11B is configured in the same manner as the first lens plate 11A. Further, the second lenses 12B are configured in the same manner as the first lenses 12A. However, the lens surface of the second lens 12B on the object side is an inner lens surface 14B (FIG. 8) as a second lens surface, and the lens surface of the second lens 12B on the image formation side is an outer lens surface 13B (FIG. 8) as a first lens surface. Both the first and second lens plates 11A and 11B are composed of a material that transmits light rays emitted from the LED element 30, which is a light emitting part.

Each curved surface (lens surfaces 13A, 13B, 14A and 14B) of the first lens 12A and the second lens 12B is made of a rotationally-symmetric high-order aspheric surface expressed by the following mathematical formula (1):

$$Z(r) = \frac{\left(\frac{r^2}{CR}\right)}{1 + \sqrt{1 - \left(\frac{r}{CR}\right)^2}} + Ar^4 + Br^6 + Cr^8 \ldots \quad (1)$$

Function Z(r) indicates a direction toward an image forming plane IP from an object plane OP using a vertex of each lens surface as a source point with positive numbers. r shows a radial rotary coordinate system centering on an axis of the lens in the optical axis direction (Z direction), and there is a relationship: $r=(X^2+Y^2)^{1/2}$ relative to each coordinate in the X and Y directions shown in each drawing. CR represents a curvature radius, A represents a fourth-order aspheric coefficient, B represents a sixth-order aspheric coefficient, and C represents an eighth-order aspheric coefficient.

Figure 7:
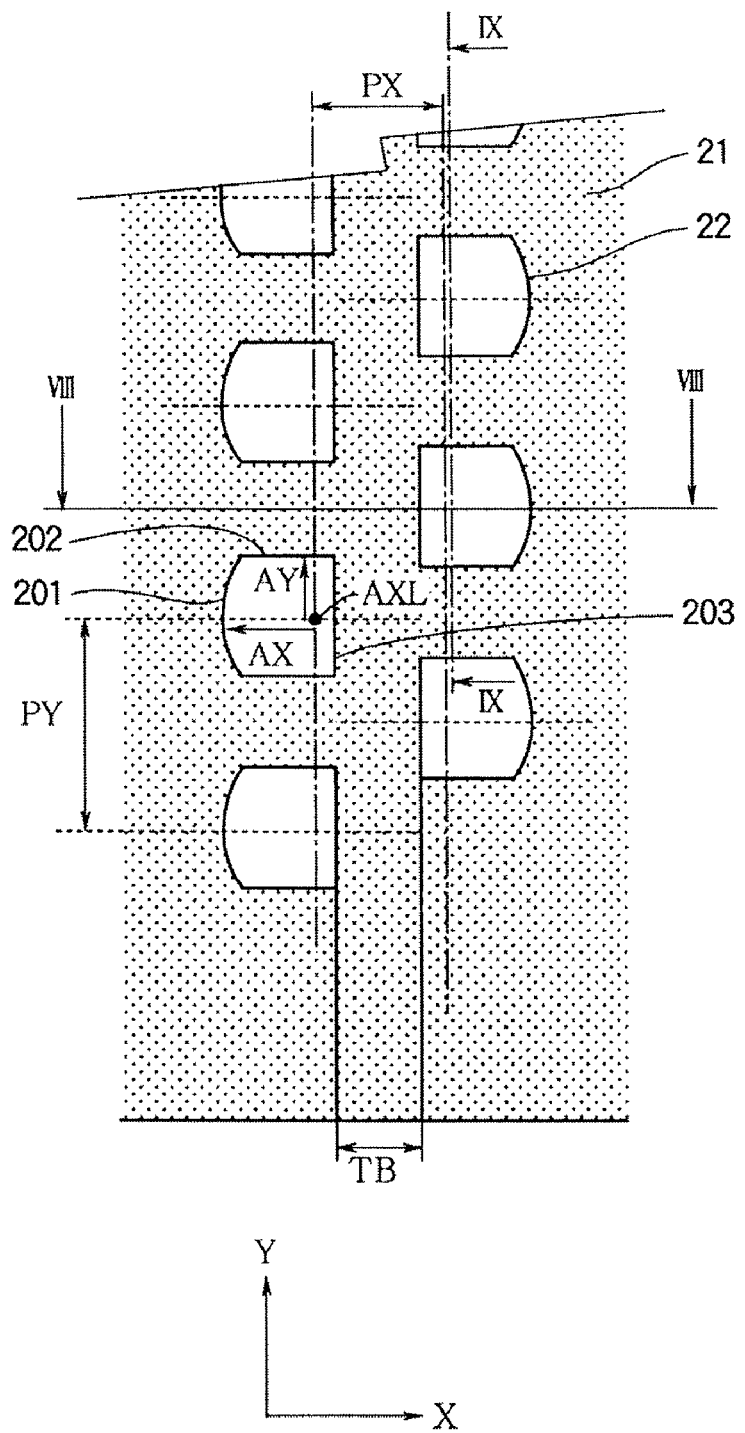
FIG. 7 is a plane view showing a light-blocking plate in the first embodiment.

FIG. 7 is a plane view showing the light-blocking plate 21. A plurality of openings 22 are formed in the light-blocking plate 21. The openings 22 are formed in positions corresponding to the first lens 12A and the second lens 12B, and are arrayed in two rows in the same manner as the lenses 12A and 12B. The array intervals of the 22 are the same as the array intervals of the first lenses 12A and the second lenses 12B. Further, a light-blocking wall with a thickness TB (dimension in the X direction) is formed between the two rows of openings 22.

The opening 22 has a shape surrounded by an arc 201, which is a part of a circle with a radius AX, two straight lines 202 in the X direction separated from the center of the circle by a distance AY (<AX) and a straight line 203 in the Y direction separated from the center of the circle by a distance (PX-TB)/2, in a cross section (XY cross section) perpendicular to the optical axis AXL. The optical axis AXL of the first lens 12A and the second lens 12B coincide with the center of the circle defining the arc 201 of the opening 22. The light-blocking plate 21 is formed from a material that blocks light rays emitted from LED material 30, which is the light emitting part.

Figure 8:
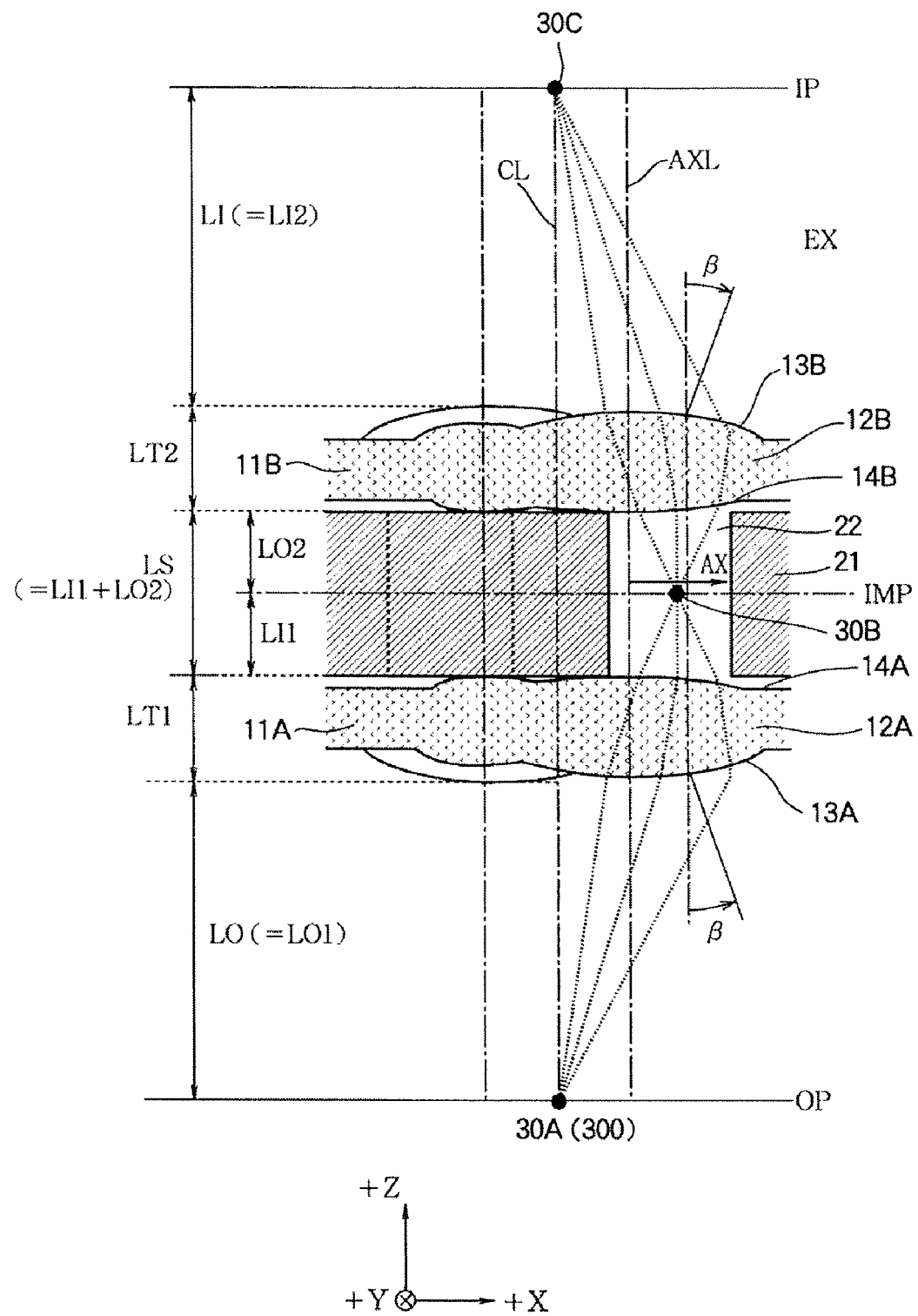
FIG. 8 is a cross-sectional diagram showing a lens unit, object plane and image forming plane in the first embodiment.
Figure 9:
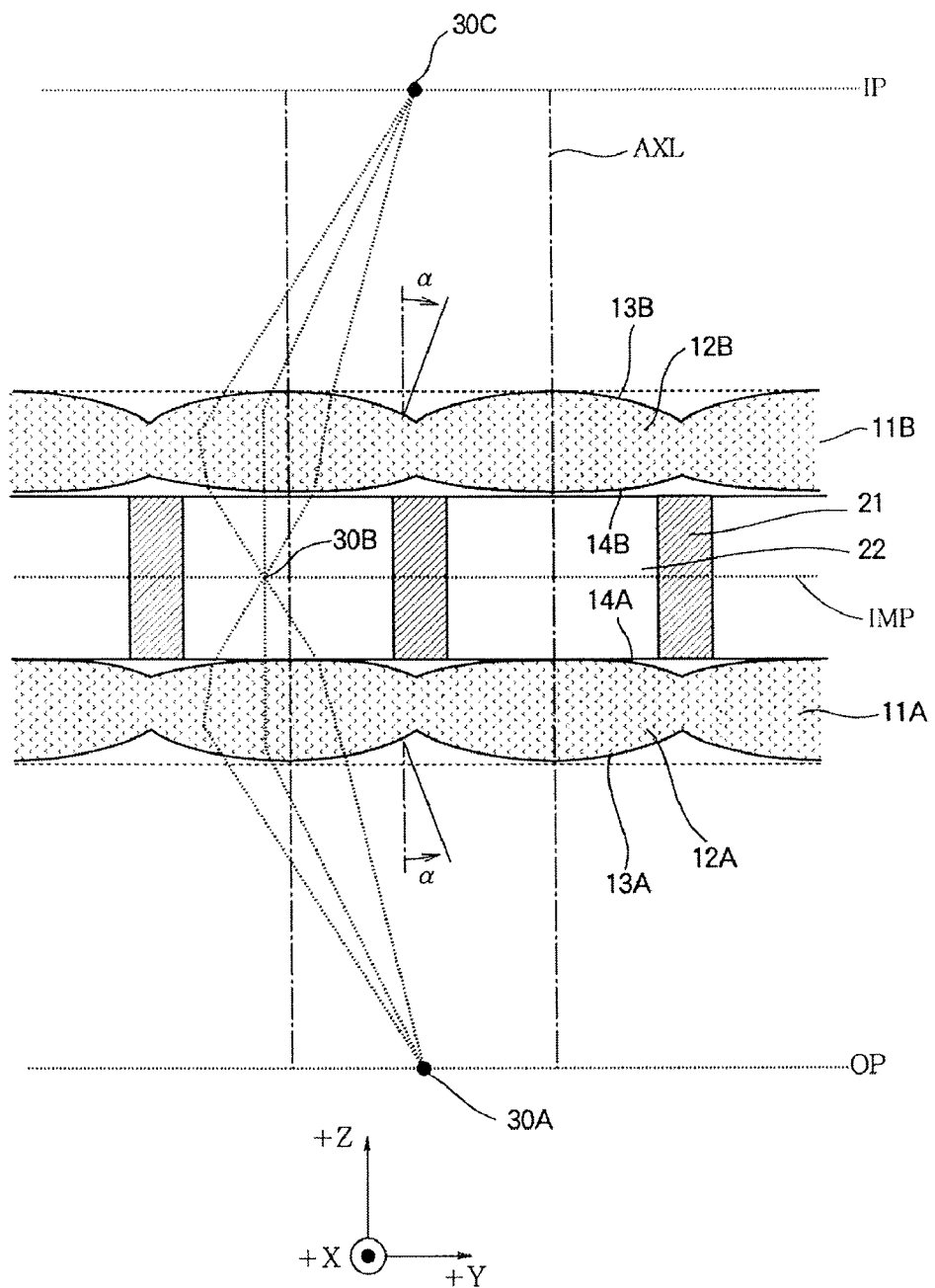
FIG. 9 is a cross-sectional diagram showing a lens unit, object plane and image forming plane in the first embodiment.

Next, with reference to FIG. 8 and FIG. 9, a maximum inclination angle of the lens surface is described. FIG. 8 is a cross-sectional diagram showing the lens unit 1, the object plane OP and the imaging plane IP, and is an XZ cross-sectional diagram including the optical axes AXL of the first lenses 12A and the second lenses 12B. Further, FIG. 8 corresponds to the cross-sectional diagram of the line segment VIII-VIII shown in FIG. 6.

In FIG. 8, the direction of the optical axes AXL of the first lens 12A and the second lens 12B is the Z direction (vertical direction) as described above. In the width direction (X direction) of the first lens plate 11A and the second lens plate 11B, an angle formed by a normal line on the surface of each lens surface 13A, 14A, 13B and 14B at an arbitrary position and the optical axis AXL is defined as an inclination angle β of the lens surface. The inclination angle β of the lens surface can be a value between 0 degree and 90 degrees according to the shape of the lens surface.

From among the inclination angles of β of all (a plurality of) lens surfaces 13A included in the first lens plate 11A, the maximum inclination angle β is defined as a maximum inclination angle βMAX for the lens surface 13A. Similarly, from among the inclination angles β of all lens surfaces 14A included in the first lens plate 11A, the greatest inclination angle β is defined as a maximum inclination angle βMAX for the lens surface 14A. Further, from among the inclination angles β of all lens surfaces 13B included in the second lens plate 11B, the greatest inclination angle β is defined as a maximum inclination angle βMAX for the lens surface 13B. From among the inclination angles β of all lens surfaces 14B included in the second lens plate 11B, the greatest inclination angle β is defined as a maximum inclination angle βMAX for the lens surface 14B.

In the present embodiment, the maximum inclination angle βMAX of a lens surface is between 13.6 degrees and 50.8 degrees inclusive. In a preferred example, the maximum inclination angle βMAX of the outer lens surfaces 13A and 13B is between 40.8 degrees and 50.8 degrees inclusive. In practical view, it is possible to realize the sufficient effect when 70% of the lenses have the maximum inclination angles 50.8 degrees or less.

FIG. 9 is a cross-sectional diagram showing the lens unit 1, the object plane OP and the image forming plane IP, and is a cross-sectional diagram on a plane including the optical axes AXL of first lenses 12A and second lenses 12B. FIG. 9 corresponds to a cross-sectional diagram of the line segment IX-IX shown in FIG. 6. In FIG. 9, in the longitudinal direction (Y direction) of the first lens plate 11A and the second lens plate 11B, an angle formed by a normal line at an arbitrary position of each lens surfaces 13A, 14A, 13B and 14B and the optical axis AXL is defined as an inclination angle α of the lens surface. The angle inclination α of a lens surface can be a value between 0 degrees and 90 degrees according to the shape of the lens surface.

From among the inclination angles α of all (a plurality of) lens surfaces 13A included in the first lens plate 11A, the greatest inclination angle α is defined as a maximum inclination angle αMAX for the lens surface 13A. Similarly, from among the inclination angles α of all lens surfaces 14A included in the first lens plate 11A, the greatest angle inclination α is defined as a maximum inclination angle αMAX for the lens surface 14A. Further, from among the inclination angles α of all lens surfaces 13B included in the second lens plate 11B, the greatest inclination angle α is defined as a maximum inclination angle αMAX for the lens surface 13B. From among the inclination angles α of all lens surfaces 14B included in the second lens plate 11B, the greatest inclination angle α is defined as a maximum inclination angle αMAX for the lens surface 14B.

In the present embodiment, the maximum inclination angle αMAX of a lens surfaces is 37.7 degrees or less and is more preferably between 13.6 degrees and 37.7 degrees inclusive. In a further preferred example, the maximum inclination angle αMAX of the outer lens surfaces 13A and 13B is between 33.5 degrees and 37.7 degrees inclusive.

The inclination angles α and β on the lens surfaces are obtained as discussed below. That is, the lens surface is measured using a three-dimensional shape measuring instrument ("Three-dimensional Measuring Machine UA3P" manufactured by Panasonic Corporation), and each coefficient in the above-described formula (1) is calculated. Then, the inclination angles α and β are calculated from the obtained formula (1). Furthermore, the inclination angles α and β are calculated, for example, using lens design software. However, the inclination angles α and β can also be calculated using another method.

The optical system of the lens unit 1 is described with reference to FIG. 8. The LED element 30 is arranged as an object 30A on an extension of the straight line (center line) CL that passes through the center of lens unit 1 in the width direction (X direction) and that is parallel to the optical axes AXL on the object plane OP. The first lens 12A is arranged in a position at a distance LO from the object plane OP. The first and second lenses 12A and 12B are arranged to be separated by a distance LS, with the inner lenses 14A and 14B thereof facing each other, such that the optical axes of the first and second lenses 12A and 12B coincide with the optical axis AXL, respectively. The image forming plane IP of the lens unit 1 is positioned at a distance (surface separation) LI from second lens 12B in the direction of the optical axis AXL. The first lens 12A has a thickness LT1, and the second lens 12B has a thickness LT2. The distances LO, LS and LI and the thicknesses LT1 and LT2 are described in the later-discussed Table 1 as surface intervals.

The first lens 12A forms an intermediate image (reduced inverted image) 30B as an image formation of the object 30A that is separated by a distance LO1 in the direction of the optical axis AXL, on an intermediate image plane IMP that is separated by a distance LI1 in the direction of the optical axis AXL. The second lens 12B forms an image formation 30C of the intermediate image 30B that is separated by a distance LO2 in the direction of the optical axis AXL, on the imaging plane IP that separated by a distance LI2 in the direction of the optical axis AXL. The image formation 30C is an equal magnification erect image of the object 30A.

The distance LO from the object plane OP of lens unit 1 to first lens 12A is set to be the same as the distance LO1 (LO=LO1). Further, an interval LS between first lens 12A and second lens 12B is set at LS=LI1+LO2. The distance LI from the second lens 12B to the imaging plane IP of the lens unit 1 is set to be the same as LI2 (LI=LI2).

<Printer Operation> The operation of the printer 100 as an image forming device as configured above is described with reference to FIG. 1. In each process unit 10, the surface of the photosensitive drum 41 is uniformly charged by the charge roller 42 to which a voltage has been applied. In accordance with the rotation of the photosensitive drum 41, when the charged surface reaches a position facing the LED head 3, the surface of the photosensitive drum 41 is exposed by the LED head 3, and thereby the electrostatic latent image is formed. The electrostatic latent image is developed by the developer 5, and the toner image is formed on the surface of the photosensitive drum 41.

In the meantime, the sheets 101 set in the sheet feeding cassette 60 are taken out one by one from the sheet feeding cassette 60 by the sheet feeding roller 61, and are carried to the transfer belt unit 8 by the carrying rollers 62 and 63. In addition, each sheet 101 is carried by sticking to and being held on the transfer belt 81, and sequentially passes through the process units 10Y, 10M, 10C and 10K. In each process unit 10, the toner image formed on the surface of the photosensitive drum 41 is transferred onto the sheet 101 due to a potential difference with the transfer roller 80 and the transfer belt 81 when the toner image reaches the vicinity of the transfer part (the transfer rollers 80 and the transfer belt 81) in accordance with the rotation of the photosensitive drum 41.

That sheet 101 that has passed process units 10Y, 10M, 10C and 10K, and on which the toner image of each color is transferred so as to superimpose is carried to the fuser 9 by the transfer belt 81. By the fuser 9, pressure and heat are applied by heating application roller 9a and pressure application roller 9b, and the toners are melted and fixed to the sheet 101. In other words, the toner images are fixed to the sheet 101. The sheet 101 to which the fixation of the toner images is completed is ejected to ejection part 66 by the ejecting rollers 64 and 65, and the operation of the printer 100 is finished.

<Operation of LED Head> Next, the operation of the LED head 3 as an exposure device is described with reference to FIG. 3. When a control signal based upon image data is sent to the LED head 3 from a control device of the printer 100, each LED element 30 emits light with an arbitrary light amount according to a control signal of a driver IC 31 of the LED head 3. The light rays emitted from the LED elements 30 are entered into the lens unit 1, and an image is formed on the surface of the photosensitive drum 41.

The action of lens unit 1 at this time is described with reference to FIG. 8 and FIG. 9. The first lens 12A forms an intermediate image 30B, which is a reduced inverted image of the object 30A, on an intermediate image plane IMP. The second lens 12B forms the image formation 30C, which is an enlarged inverted image of the intermediate image 30B, on the imaging plane IP (the surface of the photosensitive drum 41). The image formation 30C is an equal magnification erect image of the object 30A. Further, principal light rays from each point on the object plane are in parallel between the first lens 12A and the second lens 12B (i.e., in a telecentric relationship).

The light rays that do not contribute to the image formation from among the light rays emitted from the object 30A are blocked by the light-blocking plate 21. The first lens 12A, second lens 12B and opening 22 are arrayed at the same intervals, and all image formations 30C of the objects 30A (the LES elements 30) arranged in the approximately linear arrangement can be formed throughout the entire region of the photosensitive drum 41 in the longitudinal direction. The electrostatic latent image according to the image data is formed on the surface of the photosensitive drum 41 due to the rotation of the photosensitive drum 41 and the light emission of the LED heads 3.

Figure 10:
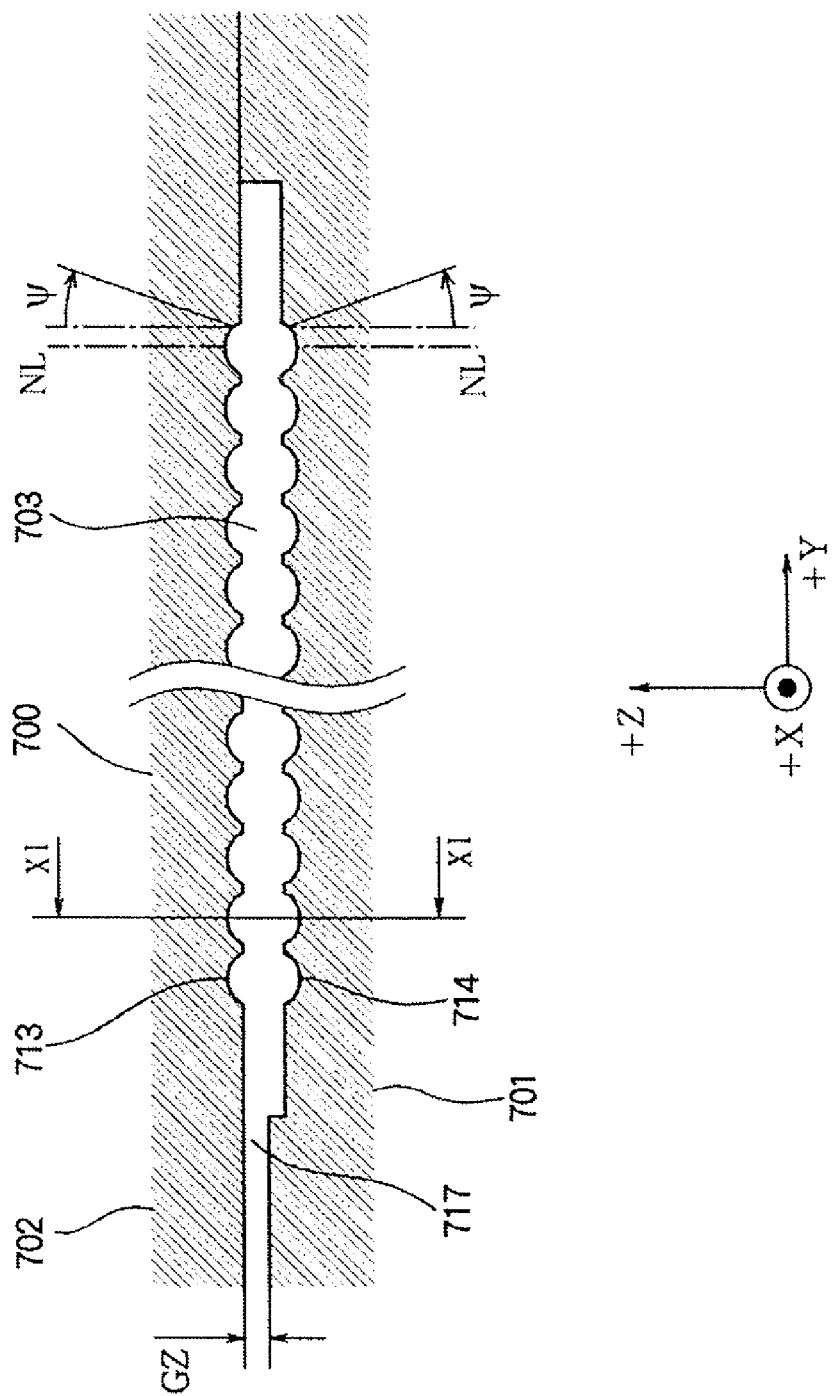
FIG. 10 is a cross-sectional diagram showing a forming die used in injection molding of a first and second lens plate in the first embodiment.

<Method for Manufacturing Lens Plate> Next, a method for manufacturing the first lens plate 11A is described. The first lens plate 11A is manufactured by injection molding. FIG. 10 is a cross-sectional diagram showing a mold (forming die) 700 used in injection molding. The mold 700 has an elongated shape in the longitudinal direction (Y direction) of the lens plate 11A and has a first mold 701 and a second mold 702. The first mold 701 and the second mold 702 are combined to form a cavity (hollow part) 703. A direction corresponding to the optical axis direction of the first lens 12A (Z direction) is defined as a mold opening direction. In a mold opening process, the second mold 702 moves to a direction to separate from the first mold 701, and a molded article is extracted from the cavity 703.

A curved surface 713 with a shape corresponding to an outer lens surface 13A and a curved surface 714 with a shape corresponding to an inner lens surface 14A are placed in the cavity 703 of the mold 700. A plurality of (the number of first lenses 12A in the first lens plate 11A of) the curved surfaces 713 and 714 are each arrayed in the approximately linear arrangement in the Y direction. The vertical direction (direction of a normal line passing a center of the surfaces) of the curved surfaces 713 and 714 coincide with the optical axis direction (Z direction) of the first and second lenses 12A and 12B.

A gate 717, which is an inlet of injection molding material (molten resin), is placed in one end of the mold 700 in the Y direction. The injection molding material sent from an injection molding machine (FIG. 12) described later passes through the gate 717, and is injected into the cavity 703 of the mold 700.

An angle formed by a normal line of a plane at an arbitrary position on the curved surfaces 713 and 714 in the longitudinal direction (Y direction) of the mold 700 and the vertical direction NL, which is the Z direction, is defined as an inclination angle $\psi$ of the curved surfaces. At this time, the inclination angle $\psi$ of the curved surfaces is the same as the inclination angle $\alpha$ of the corresponding lens surface. The inclination angle $\psi$ of the curved surfaces is a value between 0 degrees and 90 degrees according to the profile of the curved surfaces.

From among the inclination angles $\psi$ of all (a plurality of) curved surfaces 713 of the cavity 703, the greatest inclination angle $\psi$ is defined as a maximum inclination angle $\psi$MAX for the curved surface 713. Similarly, from among the inclination angles $\psi$ of all (a plurality of) curved surfaces 714 in the cavity 703, the greatest inclination angle $\psi$ is defined as a maximum inclination angle $\psi$MAX for the curved surface 714. The maximum inclination angle $\psi$MAX of each curved surface coincides with the maximum inclination angle $\alpha$MAX of the corresponding lens surface.

In the present embodiment, the maximum inclination angle $\psi$MAX of the curved surfaces is 37.7 degrees or less, and is more preferably between 13.6 degrees and 37.7 degrees inclusive. In a further preferred example, the maximum inclination angle $\psi$MAX of the curved surfaces 713 corresponding to the outer lens surface 13A is between 33.5 degrees and 37.7 degrees inclusive.

Figure 11:
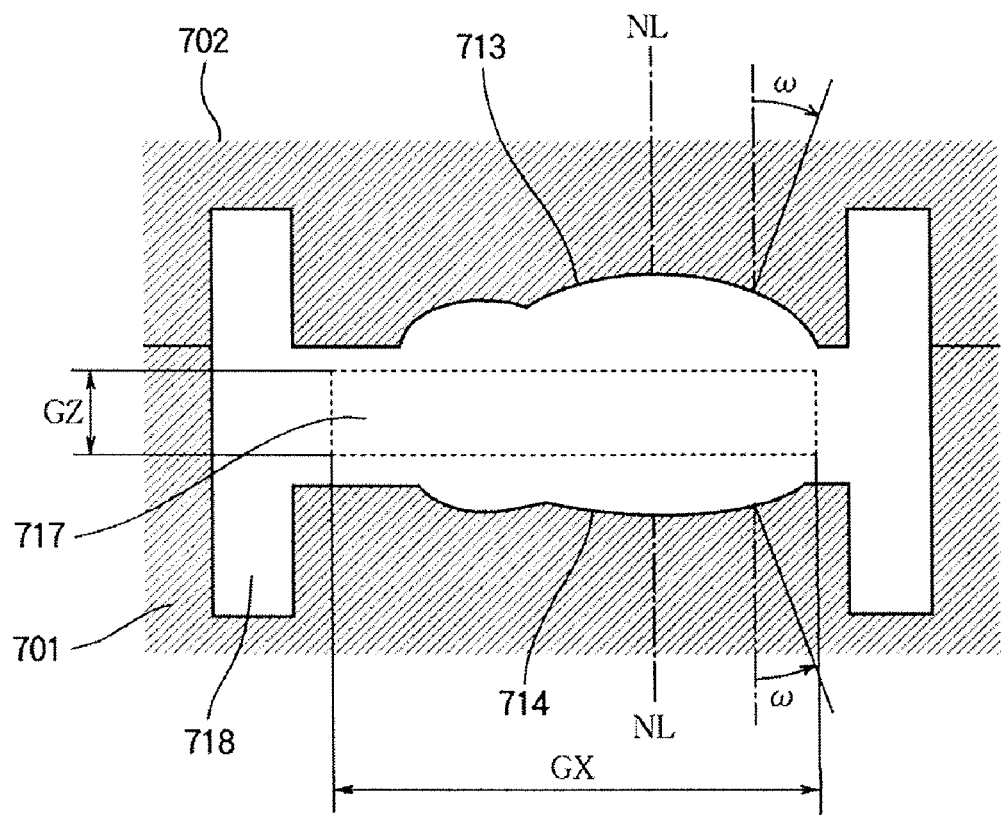
FIG. 11 is a cross-sectional diagram of a forming die in line segment XI-XI shown in FIG. 10.

FIG. 11 is a cross-sectional diagram of the mold 700 in the line segment XI-XI shown in FIG. 10. An angle formed by a normal line in an arbitrary position on the curved surfaces 713 and 714 in the width direction (X direction) of the mold 700 and a vertical direction NL is defined as an inclination angle $\omega$ of the curved surfaces. The inclination angle w of the curved surfaces is the same as the inclination angle $\beta$ of the corresponding lens surface. The inclination angle $\omega$ of the curved surfaces can be a value between 0 degree and 90 degrees according to the shape of the curved surfaces. Further, a maximum value of the angle inclination $\omega$ within each curved surface is defined as a maximum inclination angle $\omega$MAX for the curved surface. The maximum inclination angle $\omega$MAX of the curved surface coincides with the maximum inclination angle $\beta$MAX of the corresponding lens surface.

In the present embodiment, the maximum inclination angle $\omega$MAX of the curved surface is between 13.6 degrees and 50.8 degrees. In a more preferred example, the maximum inclination angle $\omega$MAX of the curved surface 713 corresponding to the external lens surface is between 40.8 degrees and 50.8 degrees inclusive.

As shown in FIG. 11, the size of the gate 717 is expressed with GX and GZ in the X direction and the Z direction, respectively. Further, a concave part (a hollow part) 718 of a shape corresponding to a rib 15 of the lens plate 11A is formed at both sides of the mold 700 in the X direction, along the Y direction.

EXAMPLES

In order to verify the effect of the present embodiment, lens units of Example 1, Example 2 and a Comparative Example were produced. Table 1 shows dimensions of each part of the lens units in Example 1, Example 2 and the Comparative Example. For the lens units in Example 1, Example 2 and the Comparative Example, the dimensions of each part shown in Table 1 are mutually in common.

TABLE 1

| Element | Item | Part | Example 1/Example 2/Comparative Example |
|---|---|---|---|
| Lens Unit | Surface Interval | LO | 3.3 |
| | | LT1 | 1.3 |
| | | LS | 2.2 |
| | | LT2 | 1.3 |
| | | LI | 3.3 |
| Lens Plate | Outer Size | L | 217.8 |
| | | W | 4.15 |
| | | H | 1.75 |
| | Lens Array Interval | PY | 1.2 |
| | | PX | 0.8 |
| | Rib Width | RB | 0.875 |
| Light-Blocking Plate | Opening Width | AY | 0.4 |
| | | AX | 0.5 |
| | Light-Blocking Wall Thickness | TB | 0.4 |

TABLE 1-continued

| Element | Item | Part | Example 1/Example 2/ Comparative Example |
|---|---|---|---|
| Lens | Opening Dimension of Outer Lens Surface 13A | RY | 0.6 |
| | | RX | 0.75 |
| | Opening Dimension of Inner Lens Surface 14A | RY | 0.55 |
| | | RX | 0.55 |
| | Opening Dimension of Outer Lens Surface 13B | RY | 0.6 |
| | | RX | 0.75 |
| | Opening Dimension of Inner Lens Surface 14B | RY | 0.55 |
| | | RX | 0.55 |

(Unit: mm)

Next, a surface shape and production condition for each of the lens plates 11A and 11B in Example 1, Example 2 and the Comparative Example are described. Table 2 shows coefficients CR, A, B and C (see the formula (1)) indicating the surface shapes of outer lens surface 13A, inner lens surface 14A, outer lens surface 13B and inner lens surface 14B.

Further, Table 2 also shows αMAX, ψMAX, βMAX and ωMAX of the curved surfaces 713 and 714 of the mold 700 used for injection molding of each lens plate. For each lens unit in Example 1, Example 2 and the Comparative Example, the production conditions are the same except for the surface shapes shown in Table 2. A material used for the lens plates 11A and 11B is an optical resin (manufactured by Zeon Corporation, product name: ZEONEX E48R), which is a cycloolefin resin, the glass-transition temperature of which is 139° C.

TABLE 2

| Element | Item | Part | Example 1 | Example 2 | Comparative Example |
|---|---|---|---|---|---|
| First Lens 12A | Outer Lens Surface 13A | CR | 0.9148 | 0.8431 | 0.8001 |
| | | A | −0.3226 | −0.3031 | −0.3694 |
| | | B | 0.4532 | 0.3825 | 0.5513 |
| | | C | −0.6266 | −0.7052 | −1.1832 |
| | Inner Lens Surface 14A | CR | −0.9537 | −1.130 | −1.2533 |
| | | A | 0.4241 | 0.4494 | 0.5475 |
| | | B | 0.1692 | 0.1655 | −0.1164 |
| | | C | 0.3756 | 0.9536 | 1.4750 |
| Second Lens 12B | Outer Lens Surface 13B | CR | −0.9148 | −0.8431 | −0.8001 |
| | | A | 0.3226 | 0.3031 | 0.3694 |
| | | B | −0.4532 | −0.3825 | −0.5513 |
| | | C | 0.6266 | 0.7052 | 1.1832 |
| | Inner Lens Surface 14B | CR | 0.9537 | 1.130 | 1.2533 |
| | | A | −0.4241 | −0.4494 | −0.5475 |
| | | B | −0.1692 | −0.1655 | 0.1164 |
| | | C | −0.3756 | −0.9536 | −1.4750 |
| Mold 700 for First Lens 12A | Curved Surface 713 of Outer Lens Surface 13A | αMAX, ψMAX | 33.5 | 37.7 | 38.9 |
| | | βMAX, ωMAX | 40.8 | 50.8 | 57.8 |
| | Curved Surface 714 of Inner Lens Surface 14A | αMAX, ψMAX | 19.3 | 13.6 | 10.9 |
| | | βMAX, ωMAX | 19.3 | 13.6 | 10.9 |
| Mold 700 for Second Lens 12B | Curved Surface 713 of Outer Lens Surface 13B | αMAX, ψMAX | 33.5 | 37.7 | 38.9 |
| | | βMAX, ωMAX | 40.8 | 50.8 | 57.8 |
| | Curved Surface 714 of Inner Lens Surface 14B | αMAX, ψMAX | 19.3 | 13.6 | 10.9 |
| | | βMAX, ωMAX | 19.3 | 13.6 | 10.9 |

(Unit of αMAX, βMAX, ψMAX and ωMAX: degrees.)

Figure 12:
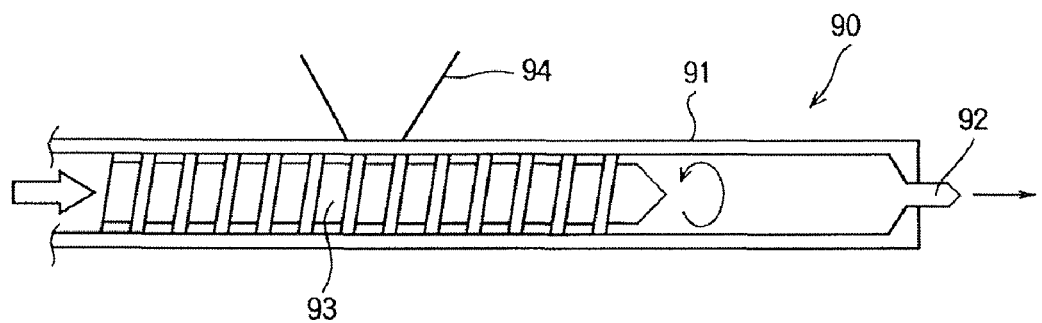
FIG. 12 illustrates one example of a schematic configuration of an injection molding machine.

<Injection Molding> FIG. 12 shows an example of a schematic configuration of an injection molding machine. An injection molding machine 90 is includes a heating cylinder 91 that heats and melts an injection molding material. A nozzle 92 for extruding the injection molding material outside is placed at an end part of the heating cylinder 91, and a screw 93 that enables rotation and straight movement is placed inside the heating cylinder 91. Here, an external diameter of the screw 93 is set to 26 mm, and an internal diameter of the nozzle 92 is set to 2.5 mm. Further, the number of revolutions of the screw 93 is set to 80 rpm, and a back pressure is adjusted to 80 kg/cm$^2$. The heating cylinder 91 is heated by a heater (not shown), and the temperature of a front part, a middle part and a rear part of the nozzle 92 are adjusted to 275° C., 280° C., 280° C. and 260° C., respectively.

The mold 700 shown in FIG. 10 is mounted to a front end part of the injection molding machine 90, and the injection molding material sent from the nozzle 92 is injected into the cavity 703 via the gate 717 of the mold 700. The dimensions GX and GZ of the gate 717 (see FIG. 11) are set to 2 mm and 1.35 mm, respectively.

Injection molding is sequentially performed in respective order of (1) a preceding process, (2) a mold clamping process, (3) an injection process, (4) a pressure keeping process, (5) a cooling process and (6) a mold opening process.

In the preceding process, the injection molding material is vacuum-dried, for example, at 100° C., and is restored to room temperature in a nitrogen gas atmosphere. The injection molding material is supplied to the heating cylinder 91 of the injection molding machine 90 via a hopper 94. The injection molding material supplied to the heating cylinder 91 is sent to the front side (the nozzle 92 side) due to the rotation of the screw 93, and is melted by heating.

Next, the first mold 701 and the second mold 702 of the mold 700 are clamped (mold clamping process). A mold clamping force at this time is set to 1,000 KN. Furthermore, the injection molding material (molten resin) is sent from the nozzle 92 due to the straight movement of the screw 93 and is injected into the cavity 703 of the mold 700 (injection process). The injection speed is within the range of 20 to 200 mm/sec., and here is set to 70 mm/sec.

Pressure keeping is started, and the injection molding material is solidified, while the injection molding material is filled into the cavity 703 (pressure keeping process). The pressure at the start time of pressure keeping is 1,000 to 1,500 kg/cm$^2$ and here is set to 1,200 kg/cm$^2$. A pressure keeping period is 3 to 10 seconds, and here is set to 7 seconds. After the pressure keeping is completed, the mold 700 is cooled to room temperature (cooling process). The first mold 701 is moved in a direction to separate away from the second mold 702 (mold opening process), and a lens plate, which is a molded article, is extracted. Here the molding cycle above is set to 90 seconds.

The first lens plate 11A and the second lens plate 11B formed by the above injection molding and the light-blocking plate 21 are combined, and the lens units 1 for Example 1, Example 2 and the Comparative Example are produced. The light-blocking plate 21 is produced using polycarbonate by injection molding.

<Evaluation method and results> Next, results for evaluating performance of the lens units 1 in Example 1, Example 2 and the Comparative Example are described. In the performance evaluation of the lens units 1, the LED head 3 in which the array interval of the LED elements 30 is PD=0.042 mm is used. In this case, since 600 pieces of the LED elements 30 are arrayed per one inch (approximately 25.4 mm), it corresponds to a resolution of 600 dpi (dots per inch).

Each lens unit 1 in Example 1, Example 2 and the Comparative Example is mounted to the LED head 3. By causing the LED elements 30 to emit light, a size WD of image formation dots 800, which are image formations of the LED elements 30, is measured.

Figure 13:
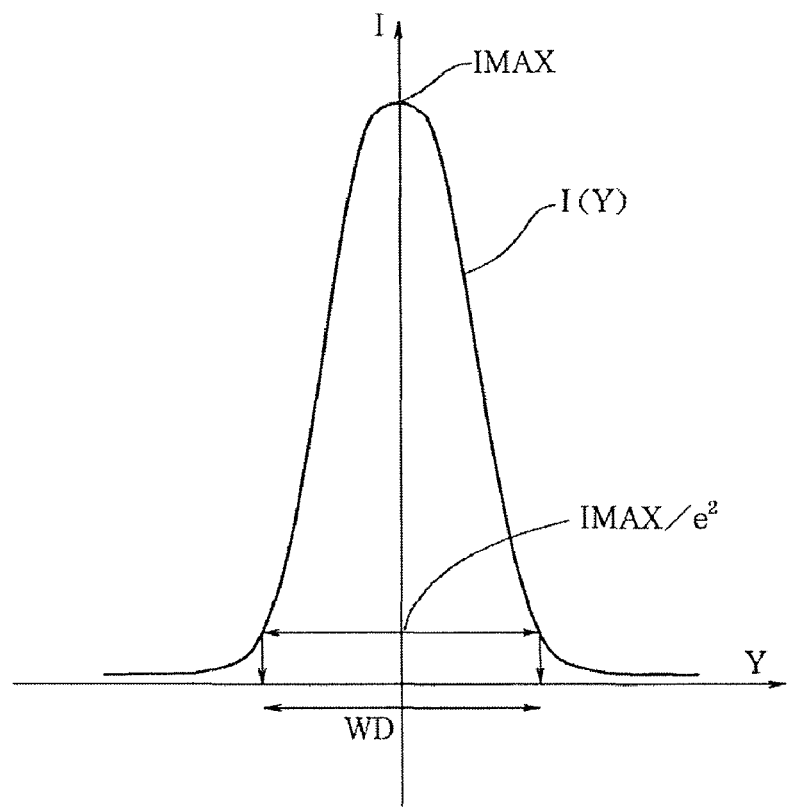
FIG. 13 is illustrates brightness distribution of image forming dots.

A method for measuring the size WD of the image formation dots 800 is as discussed below. In the measurement of WD, using the LED head 3 which the array interval of the LED element 30 is PD=0.042 mm, the LED elements 30 are illuminated with a pattern that illuminates one of the LED elements 30 while the adjacent successive seven of the LED elements 30 are turned off. FIG. 13 is a graph showing a brightness distribution I (Y) of the image formation dots 800. The brightness distribution I (Y) is a function of the coordinate Y (mm) of the lens unit 1 in the longitudinal direction (Y direction) on the imaging plane IP. The image formation dots 800 on the imaging plane IP are imaged using a charge coupled device (CCD) camera, the brightness distribution I (Y) is analyzed, and a dimension of an area where the brightness distribution I (Y) became greater than a value of a maximum value IMAX divided by $e^2$ (e: base of natural logarithm) is defined as the size WD of the image formation dots 800.

As a result of the measurement, the size WD of the image formation dots 800 was 0.041 mm in Example 1, 0.039 mm in Example 2 and 0.040 mm in the Comparative Example. In other words, for the size WD of the image formation dots, there are hardly any differences confirmed among the lens units in Example 1, Example 2 and the Comparative Example.

Next, a modulation transfer function (MTF) that indicates the resolution of the image formation of the LED elements 30 formed by the LED head 3 in which the lens units 1 of Example 1, Example 2 or the Comparative Example are mounted is measured.

The MTF indicates a contrast of the image formation dots 800 of the LED elements 30. When the MTF is 100%, the contrast is the maximum. The smaller the MTF becomes, the smaller the contrast becomes. When the maximum value for the brightness of image formation is IMAX and when a minimum value for brightness between two adjacent image formation dots 800 is IMIN, the MTF is defined by the following formula (2):

$$MTF = \frac{IMAX - IMIN}{IMAX + IMIN} \times 100 \quad (2)$$

In the measurement of MTF, using the LED head 3 in which array interval of the LED element 30 is PD=0.042 mm, the LED elements 30 are illuminated with a pattern that illuminates one of LED elements 30, while an adjacent one of the LED elements 30 is turned off. The image formation dots 800 on the imaging plane IP are imaged using a CCD camera, and the brightness distribution is analyzed.

As a result of the measurement, the MTF of the lens unit 1 in Example 1 was 90%, and the MTF of the lens unit 1 in Example 2 was 92%. In the meantime, the MTF of the lens unit 1 in the Comparative Example was approximately 85%. There were partially some low sections, and the MTF in such sections was 75%.

In addition, an image was printed using the printer 100 (LED printer) where the lens unit 1 in Example 1, Example 2 or the Comparative Example was mounted, and the printed image was evaluated.

Figure 14:
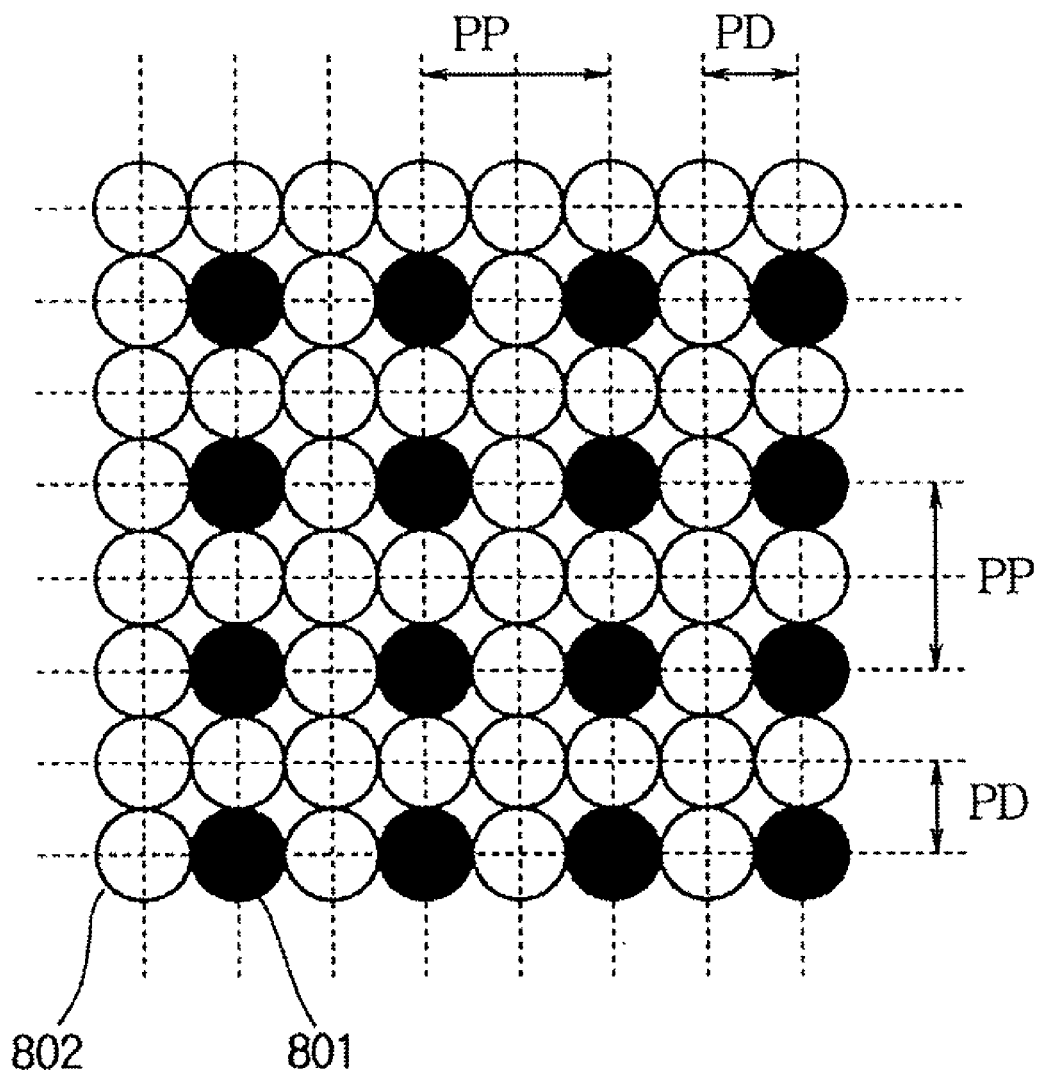
FIG. 14 is illustrates a pattern used for printing an image.

An image was printed and evaluated as described below. As the printer 100 (FIG. 1), an LED printer in which the array interval of the LED elements 30 is PD=0.042 mm was used. As a print pattern, as shown in FIG. 14, a pattern in which print dots 801 and blank dots 802 were alternately arrayed is used. The print dots 801 re parts where toner is attached, and the blank dots 802 are parts where no toner is attached, i.e., parts where the surface of a print sheet is exposed. An interval PP of the print dots 801 is set to 0.084 mm.

A print test using the pattern in FIG. 14 was conducted. As a result of evaluating the printed images, in the case of using the lens units in Example 1 and Example 2, excellent images were obtained. On the other hand, in the case of using the lens unit in the Comparative Example, density unevenness occurred, and lines were generated in the carrying direction of the sheet 101. The parts where the lines were generated matched the parts with low MTF.

Evaluation results using the lens units in Example 1, Example 2 and the Comparative Example are described. For the size WD of the image formation dots, hardly any difference was observed in Example 1, Example 2 and the Comparative Example. However, for the MTF, different results were obtained between Example 1, Example 2, and the Comparative Example.

In other words, in the Comparative Example, parts where MTF was low occurred. In this regard, in Example 1 and Example 2, the MTF was stable at 90% and 92%, respectively, and the MTF did not decrease in parts. It is believed that this is because flow marks were generated in the lens plate of the lens unit of the Comparative Example, and a portion of the light rays from the LED elements 30 became stray light due to the flow marks and reaches a position different from the image formation dots 800 of the imaging plane IP. Thereby, the contrast of the image formation dots 800 was reduced.

The flow marks are a phenomenon where disarray occurs in a flow of the injection molding material (molten resin) that flows within the mold and causes unevenness of density and a refractive index of the injection molding material in the process of injection molding for producing a lens plate. The greater the maximum inclination angles ψ and ω of the curved surfaces 713 and 714 of the mold 700 during injection molding, the more easily the flow marks are generated. The flow direction of the injection molding material when producing a lens plate is approximately a direction along the longitudinal direction (Y direction) of the mold 700 in FIG. 10.

As shown in Table 2, while the maximum inclination angle of ωMAX (X direction) of the curved surface 713 in Example 2 is 50.8 degrees, the maximum inclination angle ωMAX of the curved surface 713 of a Comparative Example is greater at 57.8 degrees. Consequently, disarray easily occurs in the flow of the injection molding material that flows within the mold when producing the lens plate of the Comparative Example; therefore, the flow marks are easily generated. As a result, it is believed that the contrast of an exposure image of the LED head 3 is decreased, and quality of a print image of the printer 100 is decreased.

The maximum inclination angle ψMAX (Y direction) of the curved surface 713 of Example 2 was 37.7 degrees. The maximum inclination angles ψMAX and ωMAX of the curved surface 714 were both 13.6 degrees, and both were smaller than the maximum inclination angle ωMAX of the curved surface 713 (50.8 degrees). In other words, the maximum inclination angles ψMAX and ωMAX were within the range of 13.6 degrees and 50.8 degrees in the entire lens plate 11A of Example 2.

Further, the maximum inclination angles ψMAX and ωMAX of the curved surfaces 713 of Example 1 were 33.5 degrees and 40.8 degrees, respectively, and the maximum inclination angles ψMAX and ωMAX of the curved surfaces 714 were both 19.3 degrees. In other words, the maximum inclination angles ψMAX and ωMAX were within the range of 13.6 degrees and 50.8 degrees in the entire lens plate 11A of Example 1.

The MTF of the LED heads 3 using the lens units 1 of Example 1 and Example 2 was high, and the print image was excellent with the LED printer 100 using the LED heads 3. Therefore, when the maximum inclination angles ψMAX and ωMAX of the curved surfaces 713 and 714 are within the range of 13.6 degrees and 50.8 degrees, it is understood that no flow mark is generated, that the contrast of the exposure image of the LED head 3 is excellent, and that the print image of the printer 100 is also excellent.

Further, as is clear from Table 2, the maximum inclination angle ψMAX of the curved surface 713 is 33.5 degrees, and the maximum inclination angle ψMAX of the curved surface 714 is 19.3 degrees in Example 1. In addition, and the maximum inclination angle ψMAX of the curved surface 713 is 37.7 degrees, and the maximum inclination angle ψMAX of the curved surface 714 is 13.6 degrees in Example 2. In other words, in all of the lens plates of Example 1 and Example 2, the maximum inclination angle ψMAX is within the range of 13.6 degrees and 37.7 degrees.

As described above, in Example 1 and Example 2, no flow marks are generated, contrast of the exposure image of the LED head 3 is excellent, and a print image of the LED printer 100 is also excellent. Therefore, when the maximum inclination angles ωMAX of the curved surfaces 713 and 714 are between 13.6 degrees and 50.8 degrees. In addition, when the maximum inclination angles ψMAX of the curved surfaces 713 and 714 are between 13.6 degrees and 37.7 degrees, it is understood that no flow marks are generated, contrast of the exposure image of the LED head 3 is excellent, and the print image of the LED printer 100 is also excellent.

In addition, as is clear from Table 2, a greater value of the maximum inclination angles ωMAX of the curved surface 713 and a curved surface 714 is the maximum inclination angle ωMAX of the curved surface 713 (40.8 degrees) in Example 1 and is the maximum inclination angle ωMAX of the curved surface 713 (50.8 degrees) in Example 2. Since no flow marks are generated, the contrast of the exposure image of the LED heads 3 is excellent, and the print image of the printer 100 is also excellent in Example 1 and Example 2, it is understood that, at least when the greater value of the maximum inclination angles ωMAX of the curved surfaces 713 and 714 is between 40.8 degrees and 50.8 degrees, no flow mark is generated, the contrast of the exposure image of the LED heads 3 is excellent, and the print image of the printer 100 is also excellent.

As is clear from Table 2, in all of Example 1, Example 2 and the Comparative Example, the maximum inclination angle ψMAX of the curved surface 713 in the Y direction is smaller than the maximum inclination angle ωMAX of the curved surface 713 in the X direction. This is because the dimension of the curved surface 713 in the longitudinal direction (Y direction) of the mold 700 is smaller than the dimension in the width direction (X direction), and because the aperture dimension RY of the lens in the longitudinal direction (Y direction) of the lens plate 11 is smaller than the aperture dimension RX of the lens in the width direction (X direction) of the lens plate 11. Here, the aperture dimension means a distance from the optical axis of the lens to an edge of the lens in a direction perpendicular to the optical axis.

According to a comparison among Example 1, Example 2 and the Comparative Example, the following can be further stated: In the Comparative Example, some sections with low MTF were observed as described above. It is believed that this is because the flow marks were partially generated since the maximum inclination angle ωMAX was as large as 57.8 degrees. In this regard, in Example 1 and Example 2, the MTF was stable at 90% and 92%, and no partial reduction of the MTF occurred. In Example 1 and Example 2, the greatest value of the maximum inclination angle (ψMAX and ωMAX) was 50.8 degrees. Therefore, when the maximum inclination angle is 50.8 degrees or less, it is understood that the flow mark is not generated and that stable and high MTF can be obtained.

Here, in order to satisfy the optical conditions shown in Table 1, in Example 1, when a maximum inclination angle βMAX of the outer lens surface 13A (the maximum inclination angle ωMAX of the curved surface 713) is 40.8 degrees, it is necessary that the maximum inclination angle βMAX of the inner lens surface 14A (the maximum inclination angle ωMAX of the curved surface 714) be 19.3 degrees. In the same manner, in Example 2, when the maximum inclination angle βMAX of the outer lens surface 13A is 50.8 degrees, it is necessary that the maximum inclination angle βMAX of the inner lens surface 14A be 13.6 degrees. Further, in the Comparative Example, when the maximum inclination angle βMAX of the outer lens surface 13A is 57.8 degrees, it is necessary that the maximum inclination angle βMAX of the inner lens surface 14A be 10.9 degrees. Therefore, it is understood that as the maximum inclination angle of an outer lens surface 13A increases, the maximum inclination angle of the inner lens surface 14A decreases.

In summarizing the above, it can be stated that the maximum inclination angle needs to be 50.8 degrees or greater in order to prevent the generation of flow marks, and that the maximum inclination angle needs to be 13.6 degrees or greater in order to further satisfy the optical conditions (Table 1). Here, the first lens 12A was explained, but the second lens 12B (the outer lens surface 13B and the inner lens surface 14B) can be explained in the same manner.

As explained above, according to the present embodiment, the generation of flow marks at the time of injection-molding a lens plate (lens array) is prevented. As a result, the contrast of the exposure image of the LED head 3 is improved, and thereby the quality of the print image of the printer 100 can be improved. In view of practical use, the invention is functionally realized when at least 70% of lenses structuring the lens array respectively have maximum inclination angles of 50.8 degrees or less.

In the present embodiment, the first lens 12A and the second lens 12B were explained to have aspheric surfaces. However, the first lens 12A and the second lens 12B may have spherical surfaces, or, may have curved surfaces, such as anamorphic aspheric surfaces, XY polynomial equations, paraboloidal surfaces, elliptical surfaces, hyperboloid surfaces or conic surfaces.

Figure 15:
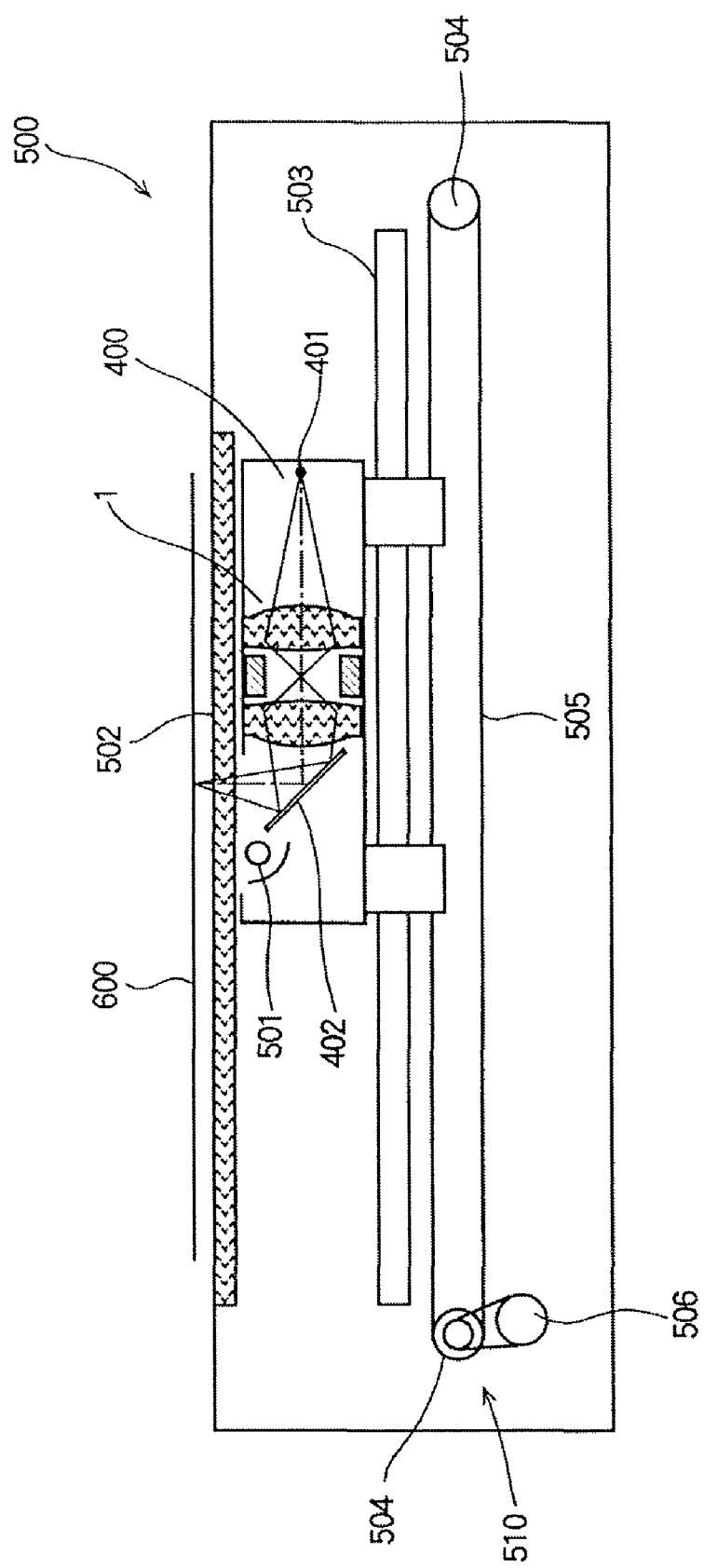
FIG. 15 is illustrates scanner as a reading device in a second embodiment of the present invention.

Second Embodiment: Next, a reading device in a second embodiment of the present application is described with reference to FIG. 15. In FIG. 15, a scanner 500 as a reading device obtains an image of a manuscript 600 and produces electronic data.

<Configuration of Reading Device> The scanner 500 includes a platen 502, on which a manuscript 600 is placed, a lamp 501 as an illuminating device for illuminating the manuscript 600, a reading head 400 that obtains light reflected by the surface of the manuscript 600 and that converts the light into electronic data, a rail 503 that supports the reading head 400 to be movable in parallel to the surface of the manuscript 600, and a drive mechanism 510 that moves the reading head 400 along the rail 503. The platen 502 is made of a material that transmits visible light. The light emitted from the lamp 501 transmits the platen 502 and is reflected by the surface of the manuscript 600. Then, the light again transmits the platen 502 and enters the reading head 400.

The drive mechanism 510 includes a motor 506, a drive belt 505 that is rotationally driven by the motor 506, and a plurality of pulleys 504 bridged by the drive belt 505. A portion of the drive belt 505 is connected to the reading head 400. The drive belt 505 moves by the rotation of the motor 506, by which the reading head 400 moves in parallel to the surface of the manuscript 600 along the rail 503. The lamp 501 is installed in the reading head 400 and moves along with the reading head 400.

Figure 16:
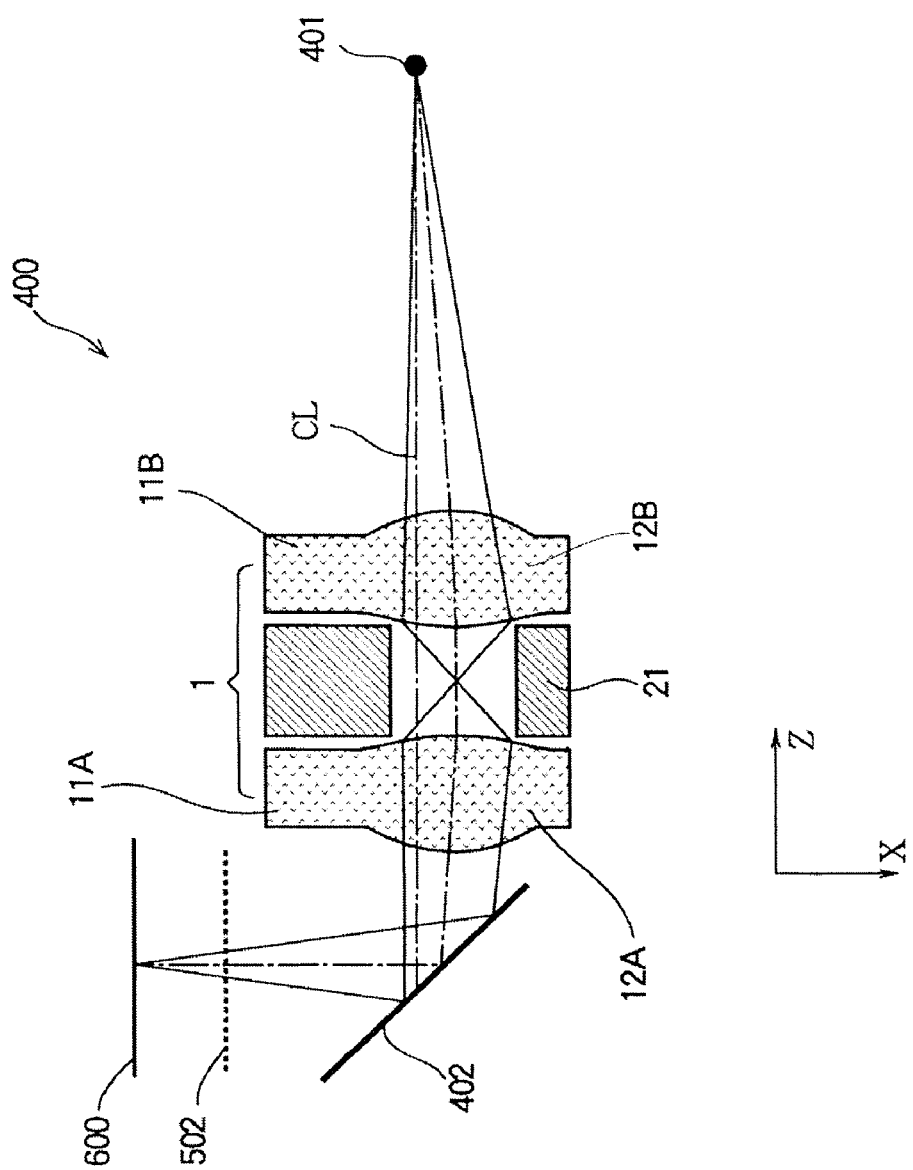
FIG. 16 is a cross-sectional diagram showing a reading head of a scanner shown in FIG. 15.

<Reading Head> FIG. 16 is a cross-sectional diagram showing a basic configuration of the reading head 400. The reading head 400 includes a mirror that bends an optical path of the light reflected by the manuscript 600, the lens unit 1 that forms an image of the manuscript 600, and a line sensor 401 arranged at the image formation position of the lens unit 1. A plurality of light receiving elements are approximately linearly arrayed in a row in the line sensor 401, and the image formation of the manuscript 600 is converted into an electric signal. The array direction of the plurality of light receiving elements in the line sensor 401 is parallel to the platen 502, and perpendicular to the movement direction of the reading head 400.

Figure 17:
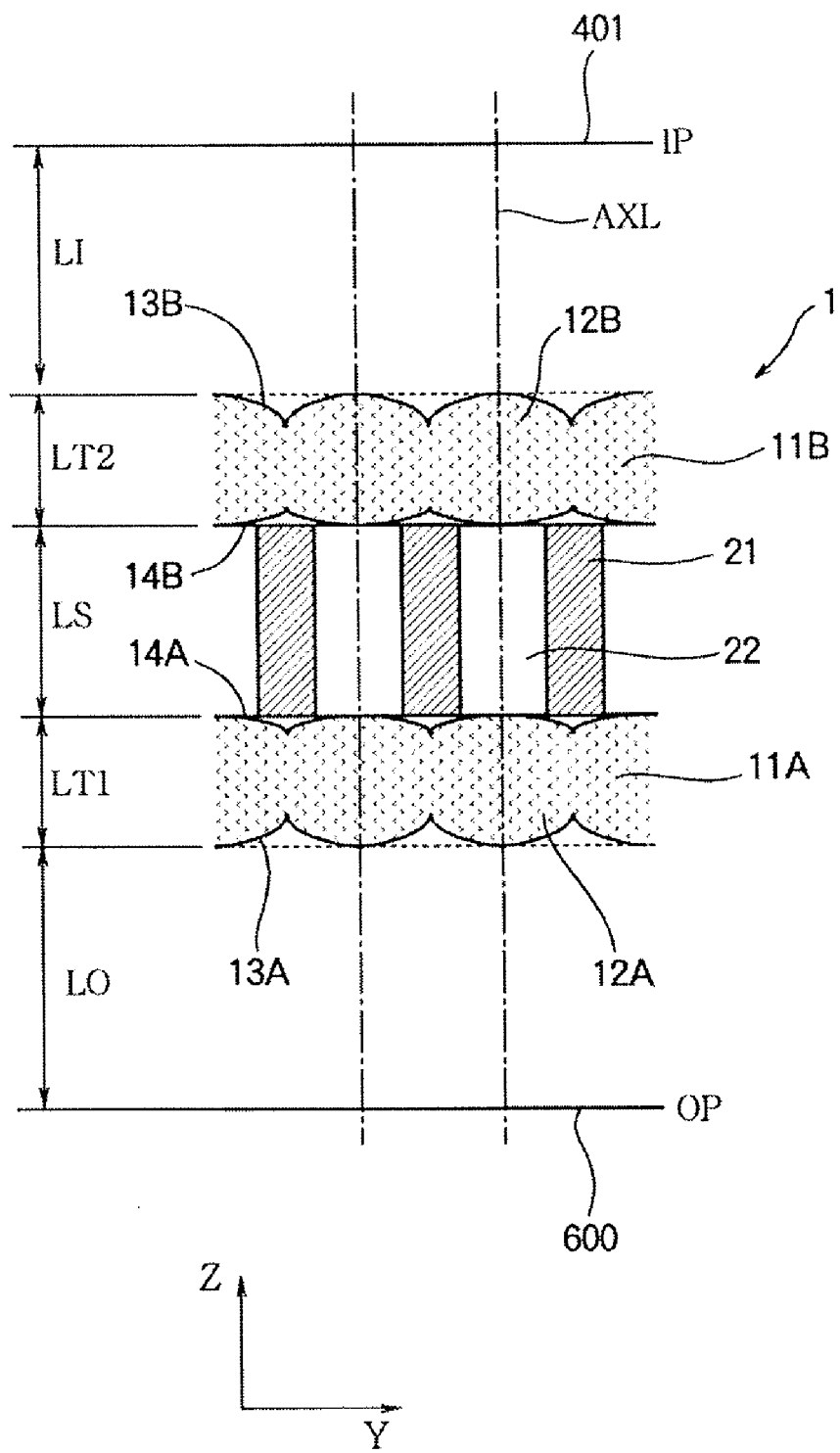
FIG. 17 is a cross-sectional diagram showing a lens unit of the reading head shown in FIG. 15.

FIG. 17 is illustrates an optical system of the reading head 400 in the second embodiment. As shown in FIG. 17, the lens unit 1 is arranged such that the object plane OP coincides with the surface of the manuscript 600 and that the imaging plane IP coincides with an incidental plane of the line sensor 401. The lens unit 1 is described in the first embodiment and includes the first lens plate 11A having the first lens 12A, the second lens plate 11B having the second lens 12B, and the light-blocking plate 21. The array direction of the first lens 12A and the array direction of the second lens 12B are parallel to the array direction of the light receiving elements of the line head 401.

<Operation of reading device> The operation of the scanner (reading device) 500 configured as described above is described with reference to FIG. 15 and FIG. 16. As shown in FIG. 15, when the lamp 501 is illuminated, light rays emitted from the lamp 501 transmit the platen 502 and are reflected by the surface of the manuscript 600, re-transmit the platen 502 and enter reading head 400. As shown in FIG. 16, the light rays entering the reading head 400 are reflected by the mirror 402, transmit the lens unit 1, and enter the line sensor 401. The image formation of the manuscript 600 is formed on the line sensor 401 by the first lens 12A and the second lens 12B of the lens unit 1, and is converted into an electric signal by the line sensor 401.

Further, as shown in FIG. 15, the drive belt 505 is driven by the motor 506, and the reading head 400 and the lamp 501 move along the rail 503. By this, the line sensor 401 of the reading head 400 retrieves a two-dimensional image of the manuscript 600.

In the second embodiment, since the lens unit 1 of the scanner 500 (reading device) includes the lens plates 11A and 11B (lens arrays) in which flow marks do not occur at the time of injection molding, the image data of the manuscript 600 is accurately taken in.

In the second embodiment, the scanner as a reading device that converts the manuscript 600 into electronic data is described as an example. However, the reading device may be a sensor or a switch that converts an optical signal into an electric signal, an input/output device using the sensor or switch, a biometric device, a communication device or a dimension measurement device.

What is claimed is:

1. A lens array, comprising:
   a plurality of lenses having respective optical axes that are approximately parallel to each other, wherein
   the plurality of lenses are configured in a direction approximately perpendicular to the optical axes and are formed integrally with each other,
   each of the plurality of lenses has a first convex surface, and a second convex surface opposite from the first convex surface, and
   a maximum inclination angle of each of the first convex surface and the second convex surface is between 13.6 degrees and 50.8 degrees inclusive, the maximum inclination angle being defined as a maximum value of an angle formed by an optical axis and a normal line of a lens surface of each of a predetermined number of the plurality of lenses.

2. The lens array according to claim 1, wherein
   the predetermined number is at least 70% of the total number of the lenses.

3. The lens array according to claim 1, wherein
   the lens array has an elongated shape in one direction, and
   the lenses are arrayed in a plurality of rows in a longitudinal direction of the lens array.

4. The lens array according to claim 1, wherein
   the lens array has an elongated shape in one direction, and
   the maximum inclination angle of each of the first convex surface and the second convex surface in a longitudinal direction of the lens array is smaller than the maximum inclination angle of each of the first convex surface and the second convex surface in a direction perpendicular to the longitudinal direction of the lens array.

5. The lens array according to claim 1, wherein
   the lens array has an elongated shape in one direction,
   the maximum inclination angle of each of the first convex surface and the second convex surface in a longitudinal direction of the lens array is 37.7 degrees or less.

6. The lens array according to claim 1, wherein
   the lens array has an elongated shape in one direction, and
   the maximum inclination angle of each of the first convex surface and the second convex surface in a direction perpendicular to a longitudinal direction of the lens array is between 40.8 degrees and 50.8 degrees inclusive.

7. The lens array according to claim 1, wherein
   the lens array has an elongated shape in one direction, and
   an aperture dimension of each lens in a longitudinal direction of the lens array is smaller than an aperture dimension of the lens in a direction perpendicular to the longitudinal direction of the lens array.

8. The lens array according to claim 1, wherein
   the lens array is formed by injection molding.

9. The lens array according to claim 1, wherein
   the lens array has an elongated shape in one direction, and
   a shape of an inlet for a material for forming the lens array is transferred to an end part of the lens array in a longitudinal direction.

10. A lens unit, comprising:
    first and second lens arrays in which a plurality of lenses are formed, respectively; and
    a light-blocking member that is arranged between the first and second lens arrays, and in which a plurality of openings are formed, wherein
    the first lens array forms a reduced inverted image of an object, the second lens array forms an enlarged inverted image of the reduced inverted image, and the enlarged inverted image is an equal magnification erect image of the object, and the first lens array and the second lens array are each configured from a lens array, the lens array comprising:
    the plurality of lenses having respective optical axes that are approximately parallel to each other, wherein
    the plurality of lenses are configured in a direction approximately perpendicular to the optical axes and are formed integrally with each other, and
    a maximum inclination angle of a lens surface on each of a predetermined number of the plurality of lenses is 50.8 degrees or less, the maximum inclination angle being defined as a maximum value of an angle formed by an optical axis and a normal line of a lens surface of one of the predetermined number of the plurality of lenses.

11. The lens unit according to claim 10, wherein
the plurality of lenses of the first array, the plurality of lenses of the second array, and the plurality of openings of the light blocking member are respectively arrayed approximately in parallel to each other in an approximately linear arrangement.

12. An LED head, comprising:
the lens unit according to claim 10.

13. An exposure device, comprising:
the LED head according to claim 12.

14. An image forming device, comprising:
the exposure device according to claim 13 mounted thereon.

15. A reading device, comprising:
the lens unit according to claim 10.

16. A forming die to be used for forming a lens array including a plurality of lenses having respective optical axes that are approximately parallel to each other, the forming die, comprising:
    separable first mold and second mold that form a cavity when clamped together for forming the lens array, wherein
    curved surfaces that correspond to lens surfaces of the plurality of lenses are formed in the first mold and the second mold, and
    a maximum inclination angle of one of the curved surfaces is 50.8 degrees or less, the maximum inclination angle being defined as a maximum value of an angle formed by a direction corresponding to an optical axis and a normal line of the one of the curved surfaces.

17. The forming die according to claim 16, wherein
at least 70% of the plurality of lenses have the maximum inclination angles that are 50.8 degrees or less.

18. A method for manufacturing a lens array using the forming die according to claim 16 where an inlet is placed at a longitudinal end of the forming die, the method comprising:
    forming a cavity by clamping the first mold and the second mold;
    injecting a molten resin into the cavity from a nozzle and filling the cavity with the molten resin; and
    solidifying the molten resin within the cavity by keeping the pressure of the forming die.

19. A lens array manufactured using the manufacturing method according to claim 18.

* * * * *